US009326348B2

(12) United States Patent
Roshan et al.

(10) Patent No.: US 9,326,348 B2
(45) Date of Patent: Apr. 26, 2016

(54) SOLID STATE ILLUMINATION SYSTEM

(75) Inventors: Rakesh Roshan, Oxford (GB); Benjamin James Hadwen, Oxford (GB); David James Montgomery, Oxford (GB); Jonathan Heffernan, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 556 days.

(21) Appl. No.: 12/663,880

(22) PCT Filed: Mar. 23, 2008

(86) PCT No.: PCT/JP2008/059956
§ 371 (c)(1),
(2), (4) Date: Dec. 10, 2009

(87) PCT Pub. No.: WO2008/152922
PCT Pub. Date: Dec. 18, 2008

(65) Prior Publication Data
US 2010/0182294 A1 Jul. 22, 2010

(30) Foreign Application Priority Data
Jun. 15, 2007 (GB) .................................. 0711595.9

(51) Int. Cl.
*G09G 3/36* (2006.01)
*H05B 33/08* (2006.01)
(Continued)

(52) U.S. Cl.
CPC .............. *H05B 33/0872* (2013.01); *G01J 1/32* (2013.01); *G01J 1/4204* (2013.01); *G01J 3/10* (2013.01);
(Continued)

(58) Field of Classification Search
CPC ......... G02F 1/157; G02B 6/002; G02B 26/02
USPC .................................. 345/207; 315/152, 312
See application file for complete search history.

(56) References Cited

U.S. PATENT DOCUMENTS 6,273,577 B1   8/2001 Goto et al.
6,445,139 B1   9/2002 Marshall et al.
(Continued)

FOREIGN PATENT DOCUMENTS

GB   2 443 204 A   4/2008
JP   2006-260927 A   9/2006
(Continued)

OTHER PUBLICATIONS

International Search Report for corresponding Application No. PCT/JP2008/059956 dated Jul. 8, 2008.
(Continued)

*Primary Examiner* — Calvin C Ma
(74) *Attorney, Agent, or Firm* — Renner, Otto, Boisselle & Sklar, LLP

(57) ABSTRACT

An illumination system comprises at least two light sources (101,102,103) having different emission spectra to one another; a detection circuit (131,132,133) for sensing a light intensity using at least one of the light sources as a photosensor; and driving means (161,162,163) for driving the light source in dependence on the sensed spectral distribution of light. The emission spectrum of a light source with the smallest bandgap overlaps the emission spectrum of a light source with the second-smallest bandgap. The illumination system is possible to measure the intensity of light emitted by the light source with the smallest bandgap by putting the light source with the second-smallest bandgap in detection mode. The illumination system may also sense the spectral distribution of ambient light, to allow the output from the illumination system to be adjusted in dependence on the ambient light.

4 Claims, 20 Drawing Sheets

(51) Int. Cl.
*G01J 1/32* (2006.01)
*G01J 1/42* (2006.01)
*G01J 3/10* (2006.01)
*G01J 3/50* (2006.01)

(52) U.S. Cl.
CPC .. *G01J 3/50* (2013.01); *G01J 3/505* (2013.01); *H05B 33/0857* (2013.01); *H05B 33/0869* (2013.01)

(56) References Cited

U.S. PATENT DOCUMENTS

| | | | |
|---|---|---|---|
| 6,469,457 B2 | 10/2002 | Callahan | |
| 6,552,495 B1 | 4/2003 | Chang | |
| 6,664,744 B2 | 12/2003 | Dietz | |
| 6,900,735 B2 | 5/2005 | Guerrieri et al. | |
| 6,963,175 B2 | 11/2005 | Archenhold et al. | |
| 7,212,287 B2 | 5/2007 | Jaffar et al. | |
| 7,492,356 B1* | 2/2009 | Pruitt | 345/172 |
| 7,507,943 B2* | 3/2009 | Ichikawa et al. | 250/205 |
| 7,569,807 B2* | 8/2009 | Matheson | 250/227.11 |
| 8,279,158 B2* | 10/2012 | Lowles et al. | 345/102 |
| 2003/0189211 A1 | 10/2003 | Dietz | |
| 2003/0222264 A1 | 12/2003 | Matsuo et al. | |
| 2004/0013372 A1* | 1/2004 | Gancarcik et al. | 385/88 |
| 2004/0208632 A1 | 10/2004 | Dietz et al. | |
| 2005/0116921 A1* | 6/2005 | Kim | 345/102 |
| 2005/0151716 A1* | 7/2005 | Lin | 345/102 |
| 2006/0018118 A1 | 1/2006 | Lee et al. | |
| 2006/0151683 A1* | 7/2006 | Brabander et al. | 250/208.1 |
| 2006/0262530 A1 | 11/2006 | Sakai et al. | |
| 2007/0019433 A1* | 1/2007 | Lowles | 362/555 |
| 2007/0278500 A1* | 12/2007 | Lin | 257/81 |
| 2010/0187422 A1* | 7/2010 | Kothari et al. | 250/353 |

FOREIGN PATENT DOCUMENTS

| | | |
|---|---|---|
| JP | 2006-278252 A | 10/2006 |
| WO | 2006/012737 A1 | 2/2006 |

OTHER PUBLICATIONS

Form PCT/ISA/237; Written Opinion.
Mims, Forrest M., III, LED Circuits and Projects, Howard W. Sams and Co., Inc., New York, NY pp. 60-61, 76-77, 122-123.
A. Zukauskas et al., Introduction to Solid-State Lighting, A Wiley-Interscience Publication, 2002, Chapter 7, pp. 133-136.
Thomas L. Floyd, Digital Fundamentals (7$^{th}$ Edition) Floyd Electronics Fundamentals Series, Chapter 14-5, pp. 782-789.

* cited by examiner

F I G. 4
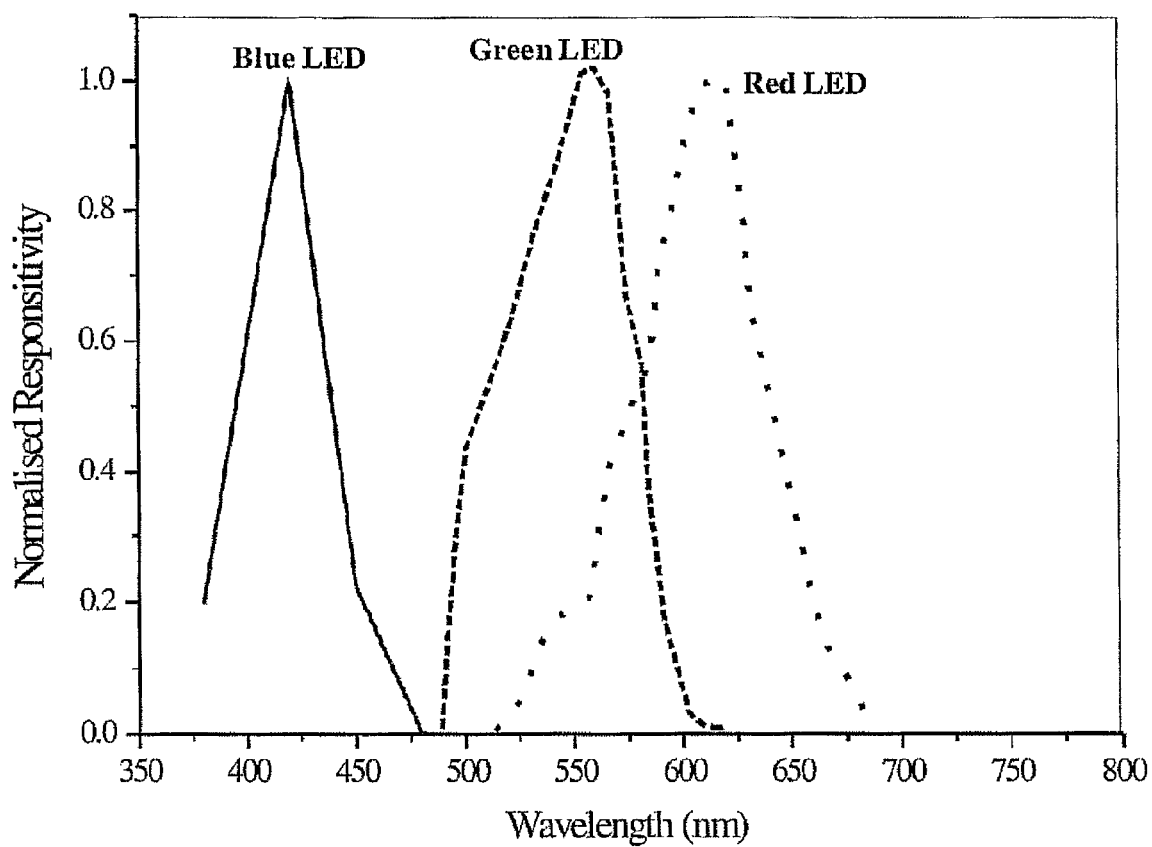

F I G. 1 2
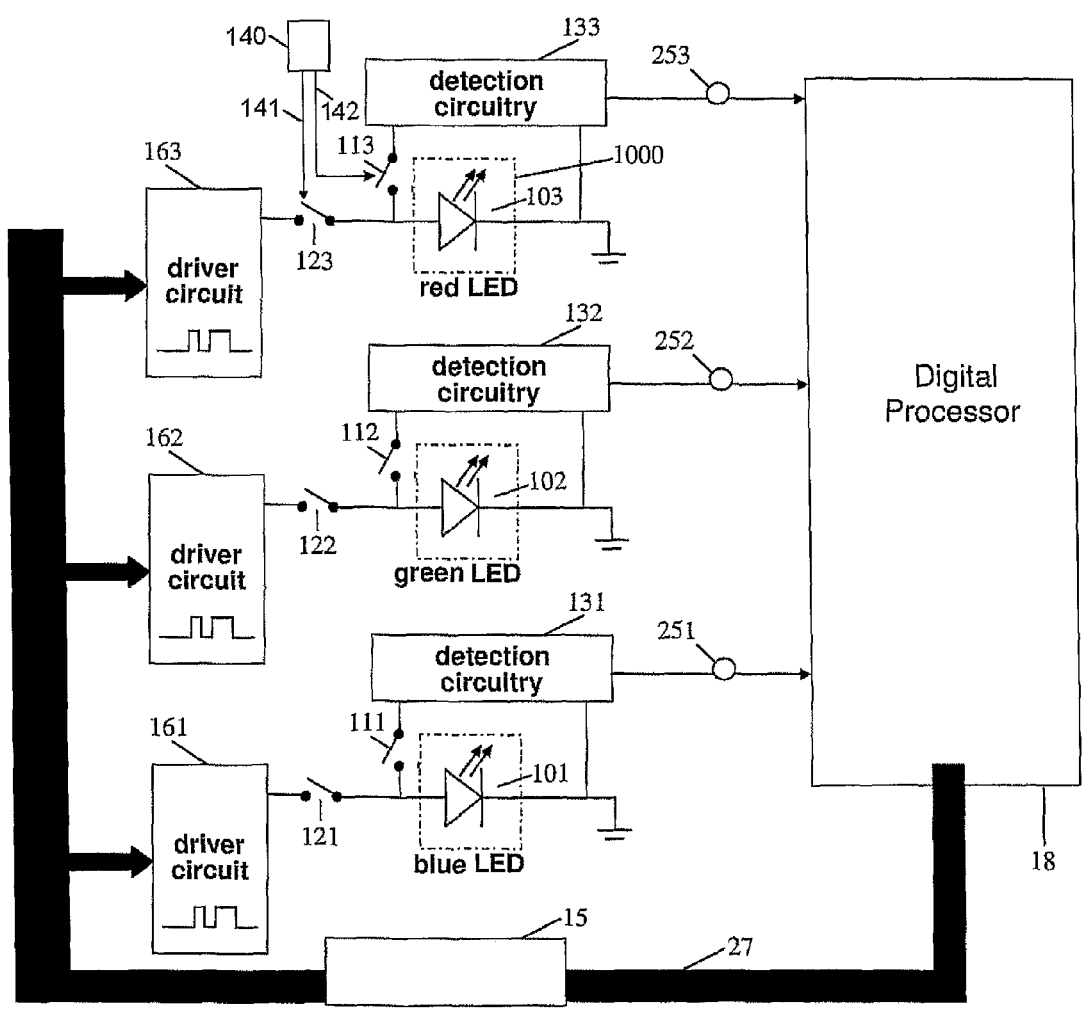

Each emission band overlaps others

F I G. 1 4 (b)
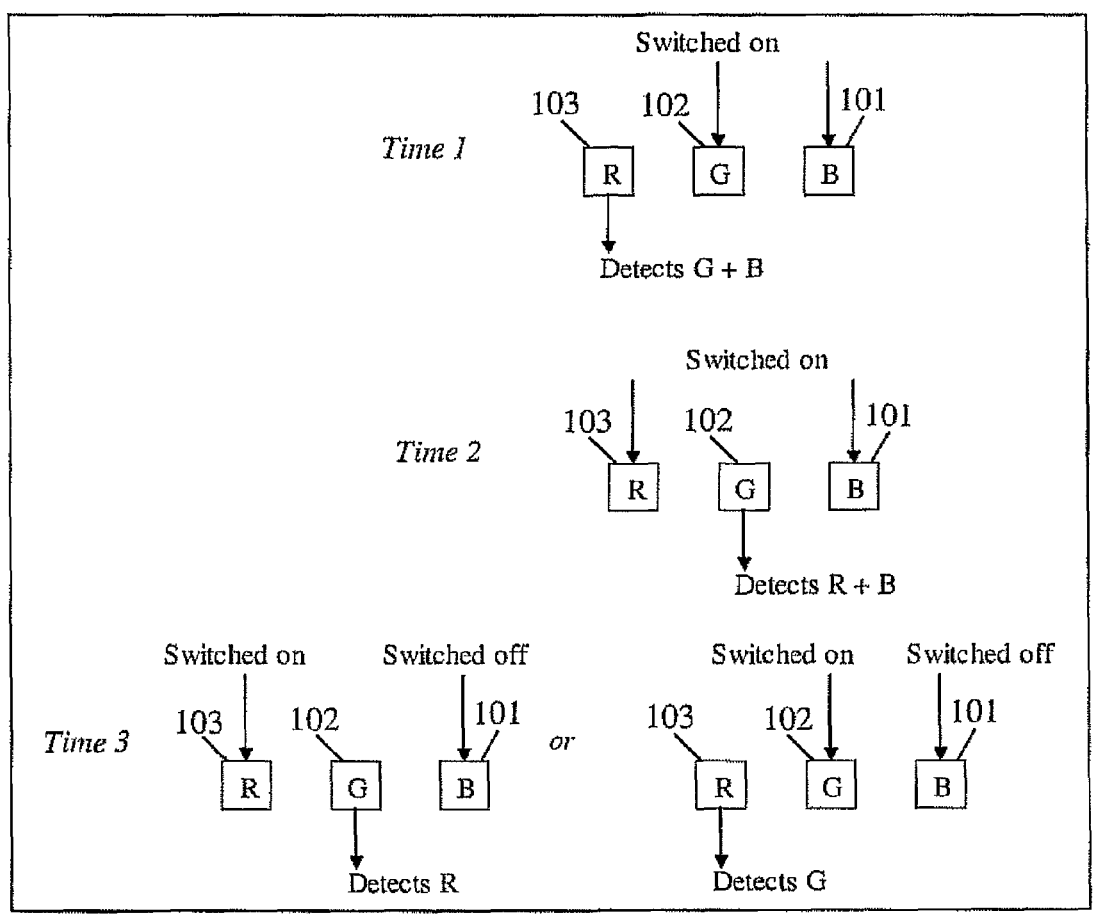

F I G. 15 (a)
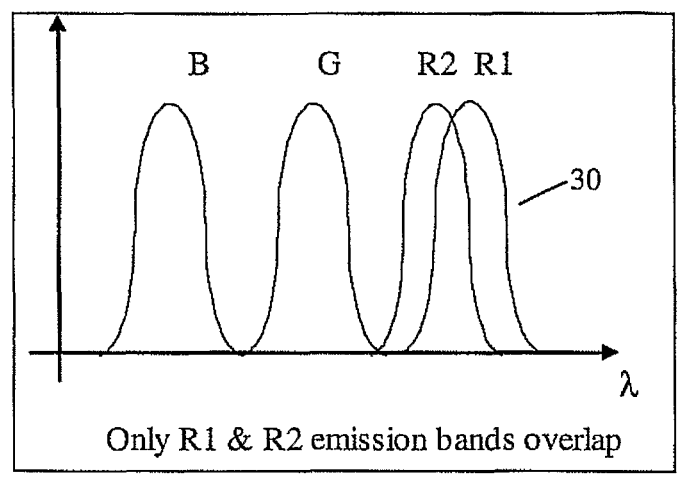

F I G. 1 5 (b)
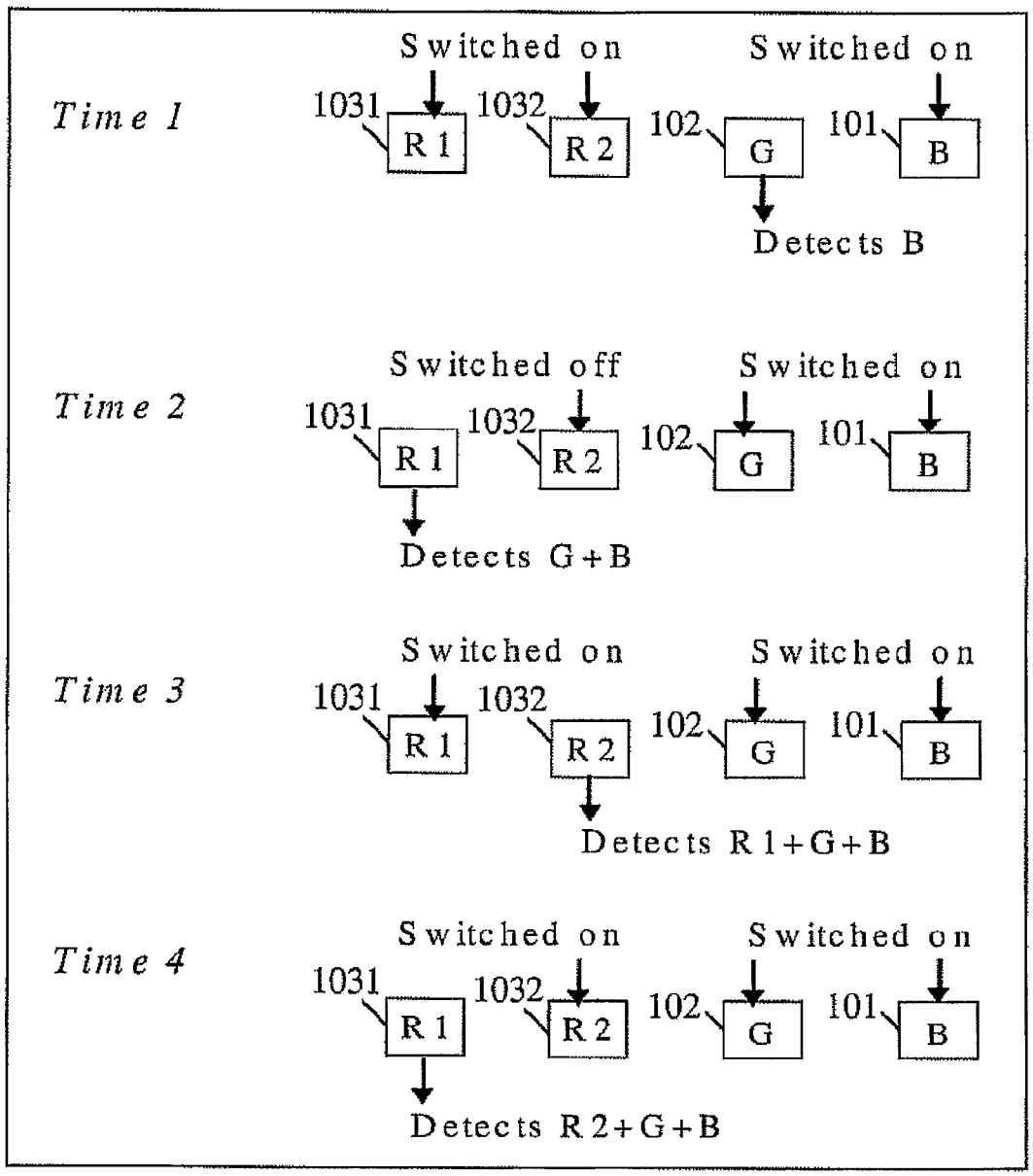

Only R & G emission bands overlap

F I G. 1 7 (a)
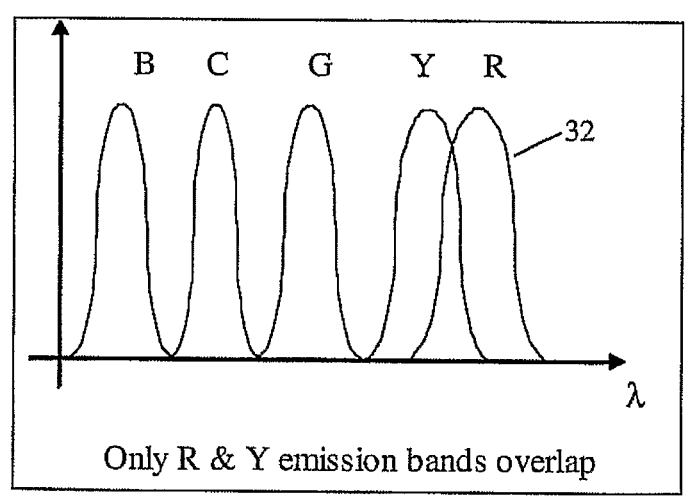
Only R & Y emission bands overlap

SOLID STATE ILLUMINATION SYSTEM

TECHNICAL FIELD

The present invention relates to Solid State Lighting (SSL) systems, and in particular to those which employ red, blue and green LEDs, phosphor converted White Light Emitting Diodes (WLEDs), or hybrid laser-LED-phosphor based light emitters. The proposed SSL system can be used in various lighting applications such as, for example, camera flash, therapy luminaires, adaptive and mood lights, traffic signals, signage, decorative illumination, corridor lights, street lights displays, etc. . . . For example, effective power management for reduced battery consumption is important for portable light sources, such as a camera mobile phone, where a plurality of phosphor converted WLEDs or individual coloured LEDs, are used as a flash for subject illumination.

SSL systems promise energy efficient, cost effective and flexible alternatives to conventional lighting methods where usually an incandescent bulb or a fluorescent lamp is used.

BACKGROUND ART

An illumination system is an electrical device that can be used to create artificial light or illumination. In the context of this invention a solid state illumination system 1000 generally uses one or more than one light emitting diodes (LEDs) 100 (see FIG. 1) to produce white or coloured light 200.

As is well-known, an LED 100 comprises a chip of semiconducting material doped with impurities to create a p-n junction. FIG. 2 shows typical current-voltage characteristics for an LED. An LED, when in forward bias 201, emits light 200, and can act as a photosensor when working in reverse bias 202 (Mims, Forrest M., III, LED Circuits and Projects, Howard W. Sams and Co., Inc., New York, N.Y., pp. 60-61, 76-77, 122-123).

FIG. 3 shows the photocurrent 2 generated by an LED as a function of the bias voltage across the LED, measured for a phosphor converted WLED at three different light levels. It can be seen that the photocurrent varies significantly with the level of ambient light when the LED is driven at or near zero bias 3, and this makes it possible to use an LED as a photosensor, for example to sense the level of ambient light. FIG. 4 shows normalised photo response curves for red, green and blue LEDs (driven at zero bias in each case), and these curves indicate that these LEDs can individually detect specific spectral areas of the ambient light. For example, the red-emitting LED can detect ambient light in the wavelength range of approximately 515 nm to 680 nm, with half-maximum sensitivity occurring over the wavelength range of approximately 580 nm to 640 nm.

An LED generally produces light in one or more defined wavelength ranges. Different approaches have been adopted to produce light of a particular desired colour balance (e.g. using multicolor LEDs or phosphor converted LEDs) and these have been described in details elsewhere (for example, by A. Zukauskas et. al., Introduction to Solid State Lighting, A Wiley-Interscience Publication, 2002).

Phosphors are fluorescent materials which absorb primary light of certain energy from a suitable source, referred to as a pump light source, and emit light at a different energy. The secondary emission achieved from these phosphors can be of higher (up conversion) or lower photon energies (down conversion) compared to that of the primary light from the pump light source. The total light output from such devices can purely be secondary emission from phosphors or a mixture of primary light emission from the pump source and secondary light emission from the phosphors. Phosphors are usually made from a suitable host material such as oxides, sulphides, selenides, halides or silicates of zinc, cadmium, manganese, aluminium, silicon, or various rare earth metals, to which an activator is added. The best known type is a copper-activated zinc sulphide and the silver-activated zinc sulphide (zinc sulphide silver).

Recently, nanophosphors have been used in place of, or together with, conventional phosphors. Nanophosphor particles are relatively small in size, typically less than 50 nm as compared to the tens of microns for conventional phosphors. A multitude of colloidal quantum dots is an example of nanophosphor.

Although SSL is energy efficient, smart and intelligent SSL systems are sought for dynamic performance, automated control and further energy savings. For example, where an SSL is used as a backlight for a display it may be desirable to control the intensity of the backlight in dependence on the level of ambient light. Conventionally, a photosensor 4 has been used with a driver 1, to regulate by feedback 300, the luminaire's 1001 output level according to the ambient light level 400 as detected by the photosensor 4 which acts as an ambient light sensor (see FIG. 5).

The above mentioned driver is typically designed to drive the LEDs in Pulse Width Modulation (PWM) mode. In this case the LED(s) of the luminaire 1001 can be switched between forward 201 and reverse bias 202 by applying suitable voltage pulses. Fine-tuning to the output illumination characteristics of the LEDs can be carried out by adjusting the driver forward voltage and pulse width.

A block diagram of the most general arrangement capable of operating a single LED in the two modes of "drive" and "detection" is shown in FIG. 6. To operate in detection mode (switch 12 open and switch 11 closed) the requirement is that a negative, zero or small positive bias $V=V_1$ is maintained across the terminals of the LED 100 by detection circuitry 13, and the current I generated by the LED 100, is measured. For a suitable choice of $V_1$ this current I will be sensitive to the level of illumination incident upon the LED (as shown in FIG. 3). The range of suitable values of $V_1$ will depend on the characteristics of the LED 100 used. In general $V_1$ is best chosen to be a value at or close to the "built in voltage" of the LED, Vbi, which is defined as the bias voltage for which zero current flows when the LED has no ambient light incident upon it. The built in voltage corresponds to the most sensitive region for operating the LED in the detection mode. Operation in the most sensitive region of the device (close to the built in voltage) may be aided by series-connecting multiple devices as described in co-pending UK patent application No. 0619581.2. Note also that for operation in detection mode the LED will not emit significant amounts of light.

In the emission mode of operation (switch 11 open and switch 12 closed) a positive bias $V=V_2$ is maintained across the terminals of the LED. There is no requirement to measure the current that flows through the LED. The intensity of light emitted by the LED is dependent on the value of $V_2$, which is controlled by driver circuitry 16. Thus it is possible to vary the brightness of the LED by varying $V_2$. An alternative method of setting the brightness of the LED is to pulse the bias voltage across the LED between a small bias $V_0$ at which there is no significant light emission and a value of $V_2$. The perceived brightness of the LED can then be adjusted by varying the fraction of time for which the bias voltage pulse is at the high level $V_2$.

An example of a practical implementation of the circuits of FIG. 6 is shown in FIG. 7. This circuit comprises the LED 100, a pulsed voltage source 17 for providing voltage pulses of pulse high level $V_2$, a measuring circuit and an analogue-to-digital converter (ADC) 18, an operational amplifier 19, a DC voltage source $V_1$ 20, capacitor 21 and a reset switch 22.

To operate the circuit of FIG. 7 in detection mode switch 11 is opened and switch 12 is closed.

The amount of light incident upon the LED is then measured as follows.

At the start of the integration period, the signal 23 turns on (closes) switch 22 and the output of the integrator is reset to $V=V_1$.

The integration period begins when the signal 23 turns off (opens) switch 22. The photocurrent is integrated on the integration capacitor 21.

The ADC 18 has its input 24 connected to the integration capacitor 21 and may be used to convert the integrated voltage to a digital value at the output 25 of the ADC. It may be configured in either sample-and-hold or continuous time operation. In sample-and-hold configuration, the output voltage from the integration capacitor 21 is sampled once at the end of the integration period and converted to a digital value. In continuous time operation, the ADC is configured to compare the integrated voltage to a fixed reference. The time taken for the integrated voltage to reach this reference is measured by a digital counter which provides the ADC output value at the end of the integration period.

To operate the circuit of FIG. 7 in the drive mode, switch 12 is opened and switch 11 is closed. Under these conditions the pulsed voltage source 17, which is of a standard type is used to apply a pulsed bias voltage across the LED 100. The amplitude of the pulse high voltage level $V_2$ and the duty cycle of the pulse are chosen as per the requirement for the amount of light emitted by the LED.

The digital output value of the ADC 18 that is representative of the incident ambient light level may be processed in several ways according to the requirements of the overall system. This could be done for example with a simple digital processor system having the ability to perform simple digital operations such as comparing digital signals, storing digital signals in memory and performing simple arithmetic operations. Examples of circuits for performing such operations are very well known and can be found for example in basic level electronics textbooks (e.g. Digital Fundamentals ($7^{th}$ Edition) Floyd Electronics Fundamentals Series, Thomas L. Floyd).

Various lighting systems that allow the output intensity to be varied are known. U.S. Pat. No. 6,469,457 describes a lighting system comprising a plurality of light fixtures, each of the said light fixtures have external dimmers which are capable of adjusting the intensity of the light fixtures. U.S. Pat. No. 6,900,735 describes an illumination device that responds to a multitude of stimuli and adapts to a multitude of purposes, such as measuring ambient temperature, using a sensor. U.S. Pat. No. 6,963,175 describes a light emitting diode illumination control which can comprise temperature sensors, displacement detectors etc. to adjust the illumination system. Agilent's HSDL-9000 ambient light sensors (peak responsivity at 510 nm) are suitable for regulating LCD backlights and prolong battery life.

U.S. Pat. No. 6,552,495 describes a control system comprising an external sensor designed for generating a desired colour from the light source using a plurality of Red, Green and Blue light emitting diodes (LEDs).

Avago Technologies illumination colour management (ICM) solution (described in U.S. Pat. No. 7,212,287) consists of a colour controller and a colour sensor to enable an RGB (red, blue and green) LEDs closed loop feedback system. ICM is a closed-loop feedback system, which monitors the hue (colour) and intensity (brightness) of the LEDs 100 times per second and then automatically adjusts the light output to ensure the right colour point is achieved.

In another solid state lighting application, Nokia N-generation mobile phone uses a CCD camera as a sensor to detect the ambient light and automatically adjusts the WLED flash light levels. However, this is not an energy efficient method as the CCD is a powered light detector and consumes battery life.

US 2003/0222264A1 describes an LED acting as a photosensor fabricated using emitter materials InGaAlP, GaAsP and GaP. The photosensitivity is designed to match eye responsivity. The device emits light in the narrow range of 590 to 630 nm whilst detecting light in the range of 500 to 620 nm.

U.S. Pat. No. 6,445,139 discloses a RGB LED luminaire with electrically adjusted colour balance. Here, analogous to other prior art mentioned above, a separate LED acts as a photosensor. By selectively turning off the electrical RGB LEDs' drive current the photodiode is intended to measure the light output for each colour LED separately. This information is then fed back to adjust the colour emitted by the luminaire.

Using a similar concept U.S. Pat. No. 6,664,744 describes a backlight where the backlight LED acts as an ambient light sensor. There is known a backlight which switches on automatically when the device in which it installed is moved (on the assumption that this indicates that the user wishes to use the device), but in such devices the backlight switches on regardless of the ambient light level. U.S. Pat. No. 6,664,744 teaches that the output from the ambient light sensor is used to prevent the backlight from switching on in bright ambient lighting conditions when the backlight is not necessary, to reduce power consumption. U.S. Pat. No. 6,664,744 also teaches adjusting the brightness level of the backlight according to ambient lighting conditions. FIG. 8 describes this invention where a backlight LED 101 and a resistor 150 are connected in series to the output and input pins of a microprocessor 151. The amount of photocurrent generated by the LED is measured by the microprocessor, which accordingly adjusts the forward driving conditions of the LED. This circuit has limited applications and can only be used in passive backlight devices (such as a backlight in remote controls or key pad backlights in mobile phones) and cannot be extended to controlling the LCD backlights where the amount of ambient light and colour variation detected by the backlight LED will be governed by the image that the LCD is displaying per frame.

WO2006/012737 discloses an illumination system in which the light-emitting elements may be switched between a first emission mode and a second detection mode. When a light-emitting element is in detection mode, it is able to detect light emitted by other light-emitting elements which has a wavelength equal to or shorter than the emission wavelength of the light-emitting element in detection mode. A second red light-emitting element is provided to act as a detector to measure light emitted by the red light-emitting element, but this further red light-emitting element is driven only in detection mode and does not contribute to the output of the illumination system.

JP 2006-260927 relates to a similar system, in which the LEDs of the system may be driven either in emission mode or in detection mode. Two red LEDs, two green LEDs and two blue LEDs are provided, so that one red LED may be used as a photodetector to detect emission from the other red LED.

DISCLOSURE OF INVENTION

A first aspect of the present invention provides an illumination system comprising: two or more light sources having different emission spectra; a detection circuit for sensing an intensity of light using at least one of the light sources as a photosensor; and driving means for driving the light source(s) in dependence on the sensed intensity of light; wherein the emission spectrum of a light source with the smallest bandgap overlaps the emission spectrum of a light source with the second-smallest bandgap.

In an illumination system of the invention, a light source is driven to act as a light sensor (whether it acts as light source or a light sensor is determined by the bias applied between the terminals of the device), and the illumination system automatically regulate the output illumination which is spectrally adjusted to the determined light levels.

By arranging for the emission spectrum of the light source with the second-smallest bandgap to overlap the emission spectrum of the light source with the smallest bandgap it is possible to measure the intensity of light emitted by the light source with the smallest bandgap by putting the light source with the second-smallest bandgap in detection mode. For example, the emission from a red light source may be measured by putting a green light source in detection mode, if the emission spectrum of the green light source is arranged to overlap the emission spectrum of the red light source. The present invention does not therefore require an additional photodetector to be provided to measure the intensity of light emitted from the light source with the smallest bandgap (ie with the highest wavelength).

An illumination system of the invention may be used to sense the intensity of light from light sources of the illumination system, for example to allow control of the white point of an illumination system for emitting white light. It may also be used to sense the intensity of ambient light.

Additionally the illumination system may also sense the spectral distribution of light, eg of ambient light. In some applications, control of a luminaire on the basis of solely the ambient light intensity may not be sufficient. Even if two ambient light intensities are same, the ambient spectral information could be significantly different for the two cases. FIG. 9 shows the spectral power distribution of noon sunlight 5, and FIG. 10 shows the spectral power distribution of a florescent lamp 6 (solid curve), and tungsten lamp 7 (dotted curve) suggesting that the spectra for common light sources are different—this leads to a large variation in the ambience condition experienced by portable luminaire systems with a particular type of detector. Also, it is well known that the spectral density of sunlight changes during the course of the day and shifts towards the blue at noon and is relatively red in the morning and evening.

In the case of a flash light for a camera, for example, in order to obtain a true reproduction of the tones of an original image the spectral output of the flash light would preferably depend on the spectral power distribution of the ambient light. U.S. Pat. No. 6,664,744 cannot however take account of the spectral power distribution of the ambient light.

For example, the illumination system may comprises a controller or processor which measures the photocurrent generated by the light source(s) operating in sensing mode and calculates the ambient light level and spectral information. The relative signals from light sources having different wavelength sensitivity characteristics give a spectral signature of the ambient light, and thus allow changes in the ambience light colour to be detected. This information is then fed back to the drivers driving the light sources of the illumination system to dynamically adjust the forward driving condition of the light sources as per the detected ambient lighting conditions.

Furthermore, a white light illumination system typically contains two or more light sources having different emission wavelength ranges, such as red, green and blue-emitting LEDs. If the light sources degrade at different rates, e.g. due to ambient temperature variations or age, the spectrum of the emitted white light will change. Thus a simple self-correcting mechanism within the illumination system to maintain constant output spectral characteristics over time will be attractive and useful for many applications such as, for example, LED based television and other displays.

A solid state illumination system which automatically responds and adjusts its output level according to sensed colour balance of ambient light, or according to sensed changes in the colour balance, without using a separate photo sensor or colour sensor is highly desirable and is not possible using the prior art mentioned above.

A summary of the principal advantages of the proposed illumination system are:
  It adapts automatically for colour as well as intensity corrections;
  It is economically very attractive as it removes the need for any extra photo sensor;
  It does not need complicated circuitry or space;
  It reduces overall implementation cost;
  It reduces unnecessary power consumption of the solid state lighting system.

In one embodiment of the invention, the detection circuit is adapted to, in one time period, sense an intensity of light using the at least one of the light sources as a photosensor while none of the light sources is driven to emit light. In this embodiment an ambient light intensity is sensed in the one time period. Moreover, if two or more light sources are used as photosensors a spectral distribution of ambient light may also be sensed.

In another embodiment of the invention the illumination system is adapted to, in another time period, sense a spectral distribution of light using at least a first one of the light sources as a photosensor and cause at least a second one of the light sources to emit light. In this aspect, an intensity of light from the second light source, and possibly a spectral distribution of light from the second light source, are sensed.

A second aspect of the present invention provides an illumination system comprising: one or more light sources; a detection circuit for sensing a light intensity using at least one of the light sources as a photosensor; driving means for driving the light source(s) in dependence on the sensed light intensity; and a light guide for receiving light from the light source(s); wherein the light guide has a first portion for light emission and second portion different from the first portion for receiving ambient light, the light guide being so configured such that, in use, an object to be illuminated does not cover the second portion of the light guide.

Each light source may be a solid state light source.

Each solid state light source may be a light-emitting diode.

A third aspect of the present invention provides a display comprising: an image display panel, and an illumination system of the first or second aspect for illuminating the image display panel.

The image display panel may be disposed adjacent to the first portion of the light guide.

A fourth aspect of the present invention provides a flashlight comprising an illumination system of the first or second aspect.

A fifth aspect of the present invention provides a method of operating an illumination system comprising two or more light sources having different emission spectra, wherein the emission spectrum of a light source with the smallest bandgap overlaps the emission spectrum of a light source with the second-smallest bandgap, the method comprising: driving the light source with the smallest bandgap to emit light and using the light source with the second-smallest bandgap to sense the intensity of light emitted by the light source with the smallest bandgap.

BRIEF DESCRIPTION OF DRAWINGS

Preferred features of the invention will be described by way of illustrative example with reference to the accompanying figures in which:

FIG. 4 shows normalised photoresponsivity measured for a red-green-blue (RGB) LED system;

FIG. 12 is a block diagram of an illumination system using a plurality of LEDs;

FIGS. 15(a) and 15(b) illustrate the driving mechanism for an embodiment using RGB LEDs where two red LEDs are used such that the emission bands of the two red LEDs overlap each other;

FIGS. 17(a) and 17(b) illustrate the driving mechanism for an embodiment using RGBCY LEDs where the emission bands of the yellow and red LEDs overlap each other.

BEST MODE FOR CARRYING OUT THE INVENTION

Figure 11:
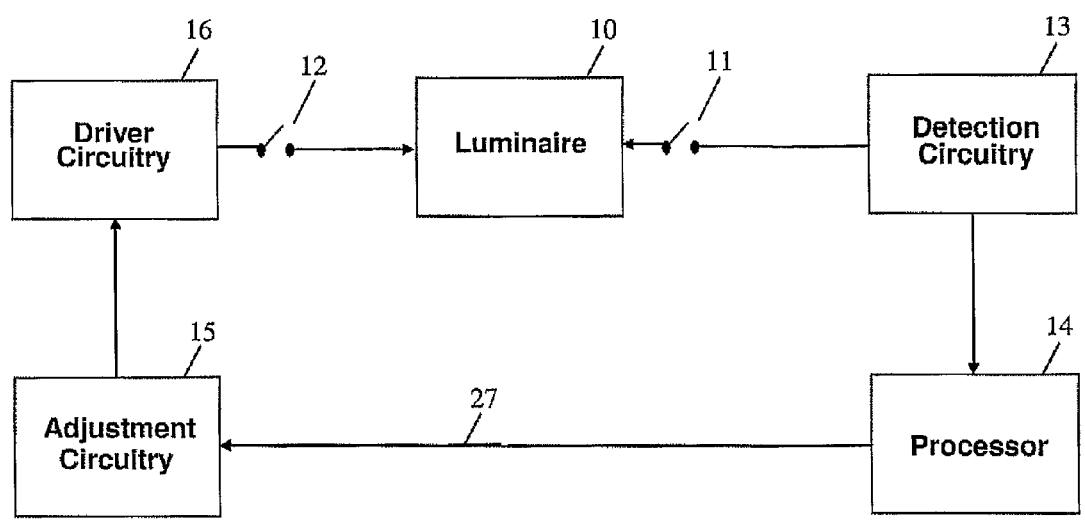
FIG. 11 is a schematic diagram of an illumination system according to a first embodiment of the invention.

FIG. 11 shows a block schematic diagram of an illumination system according to a first embodiment of the invention. In this embodiment an illumination system which automatically adjusts its output emission according to the changes in the ambient light levels is disclosed. Here the illumination system consists of a light-emitting portion 10 comprising two or more light sources, for example, two or more solid state light sources such as LEDs, which, according to the bias applied across the light source, act either as an emitter or as an ambient light sensor. (Embodiments of the invention will be described using LEDs as the light sources, but the invention is not limited to this.)

In FIG. 11, the light-emitting portion 10 of the illumination system is connectable to a detection circuit 13 by a first switch 11 or to a driving circuit 16 by a second switch 12. The first and second switches 11, 12 may be operated by a suitable control means (as described below with reference to FIG. 12). When switch 11 is closed and switch 12 is open, detection circuit 13 is used to bias at least one of the light sources in a photosensitive operating region to detect light. The measured photocurrent is passed on to a digital processor 14 which calculates the detected light level and spectral information. For example, by driving two or more light sources having different spectral characteristics as light sensors it is possible to obtain information about ambient light intensity in two different wavelength ranges, and thus obtain information about spectral power density.

When switch 11 is open and switch 12 is closed the driver circuit drives the light source(s) to emit light. The driver circuit is able to make use of information about the detected light level and spectral information to drive the light source(s) to obtain a desired spectral output.

An adjustment circuitry 15 is provided in the illumination system of FIG. 11 in a feedback loop 27. The circuitry 15 first compares the incoming information from the digital processor 14 with target spectral information already stored in the adjustment circuitry 15 (for example in a case where the illumination system is designed to give a typical spectral output). The circuitry determines desired intensities for the light source(s), and passes this information to the driver circuit 16.

As an example, the illumination system may determine that the spectrum of ambient light is biased towards the red end of the spectrum, eg, contains more light at the red wavelengths (and less light at blue wavelengths) than the spectrum for bright sunlight. The adjustment circuitry 15 would accordingly control the drive circuit 16 such that, in the light output from the illumination system, the emitted intensity of blue light was increased relative to the emitted intensity of red light.

The adjustment circuitry may preferably store several sets of target spectral information, each set corresponding to a certain pre-defined lighting condition (such as, for example, bright sunlight, dusk, dawn, or illumination conditions relating to medically healing outputs that cater for particular physiological phenomena/aspects). A user is able to select one of the sets of stored spectral information, depending on a desired application.

According to this embodiment the lighting system does not use any external photo sensors or colour sensors for sensing changes in the ambience light level conditions and performing automatic illumination adjustments. This saves costs and the overall implementation is simpler requiring only minor circuitry modifications into existing electronics.

Using the proposed embodiment a smart portable light source such as a LED camera flash etc. can be constructed in such a way that it can adjust itself and compensate for the colour balance of the ambient light. For example, it can emit more/less blue light depending on the operating environment such as under tungsten light, florescent light or evening sun. Current methods allow only a fixed spectral light output from these types of devices and do not have an automatic adjustment facility.

The proposed embodiment can be very useful for applications where a user desires a specific spectral output from an illumination system such as a spectrum similar to that of a morning or an evening sun, so that the output of the illumination system replicates the specific output desired by the user. This allows the illumination system to imitate lighting conditions desired by the user for different applications (for example lighting conditions typical of particular times of the day or for addressing physiological conditions such as seasonal affective disorders SAD) while simultaneously adapting to the ambient lighting conditions.

There are many possible circuitry arrangements that could be used for implementing the above embodiment, and other embodiments, of the invention. Typical examples for this have already been described in the prior art section. In the description above the light sources have been assumed to be to LEDs, but the invention is not limited to the use of LEDs and any light source capable of being switched between "detection" and "drive" modes of operation may be used. In addition implementations using more than one light-emitting portion and/or more than one type of light source are possible.

In the detection mode of operation the LED (or other light source) is biased in such a way that the current through the device is dependent upon the amount of ambient light incident upon it. In this mode of operation the amount of light emitted from the LED (or other light source) will negligible.

The light-emitting portion 10 described above can consist of one of more LEDs 100 designed to emit a single colour or combination of colours such as, for example, one of:
 i) Individual LEDs of each desired colour, for example a blue LED 101, a green LED 102, and a red LED 103 etc.;
 ii) Combination of two coloured LEDs, eg blue LED 101 and green LED 102, green LED 102 and Red LED 103, or blue LED 101 and Red LED 103;
 iii) One or more LEDs, eg a Blue LED 101, pumping conventional phosphors or nanophosphors;
 iv) Combination of LEDs 100, phosphors and other light sources such as lasers.

The present invention has, broadly, two different aspects. In one aspect, all of the LEDs are OFF (ie, not emitting light) when one LED is put into detection mode, so that only the ambient light is detected. The emission of the LED(s) may then be adjusted based on the detected ambient light. In another aspect, when an LED is put into detection mode one or more of the others LEDs of the illumination system are ON (ie, emitting light), so that an LED in detection mode detects light from the LEDs that are ON (in this case the ambient light level is small compared to the other LED's emission and can generally be neglected) to provide information about the output from the LEDs of the illumination system—for example, the colour balance of the output from the LEDs can be measured, as described in more detail below.

It is possible to combine these two aspects, by detecting initially with all of the LEDs OFF (ie, not emitting light) and subsequently detecting with one or more of the other LEDs ON (ie, emitting light), or vice versa. This provides information both about the ambient light and about the output from the LEDs of the illumination system.

Figure 1:
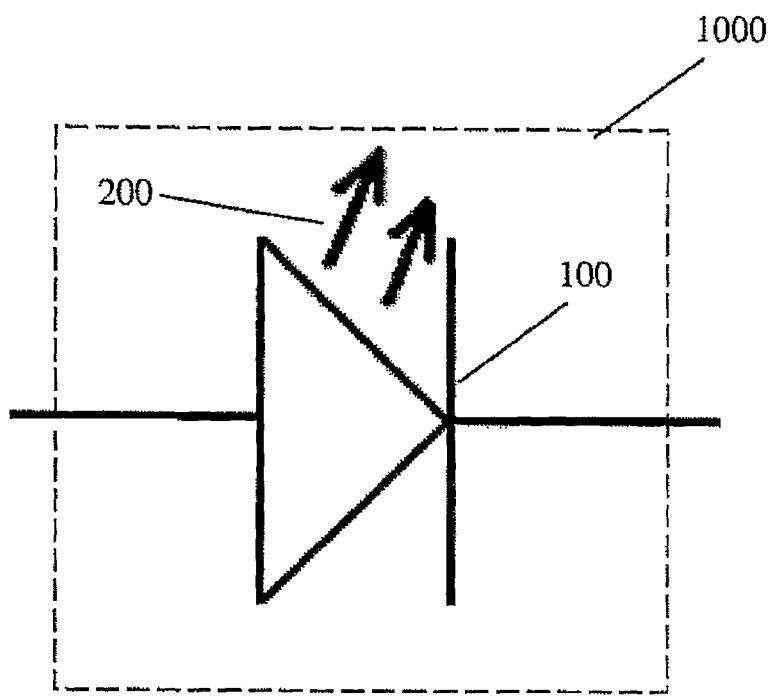
FIG. 1 is a schematic diagram of a LED based luminaire as an example of prior art.
Figure 2:
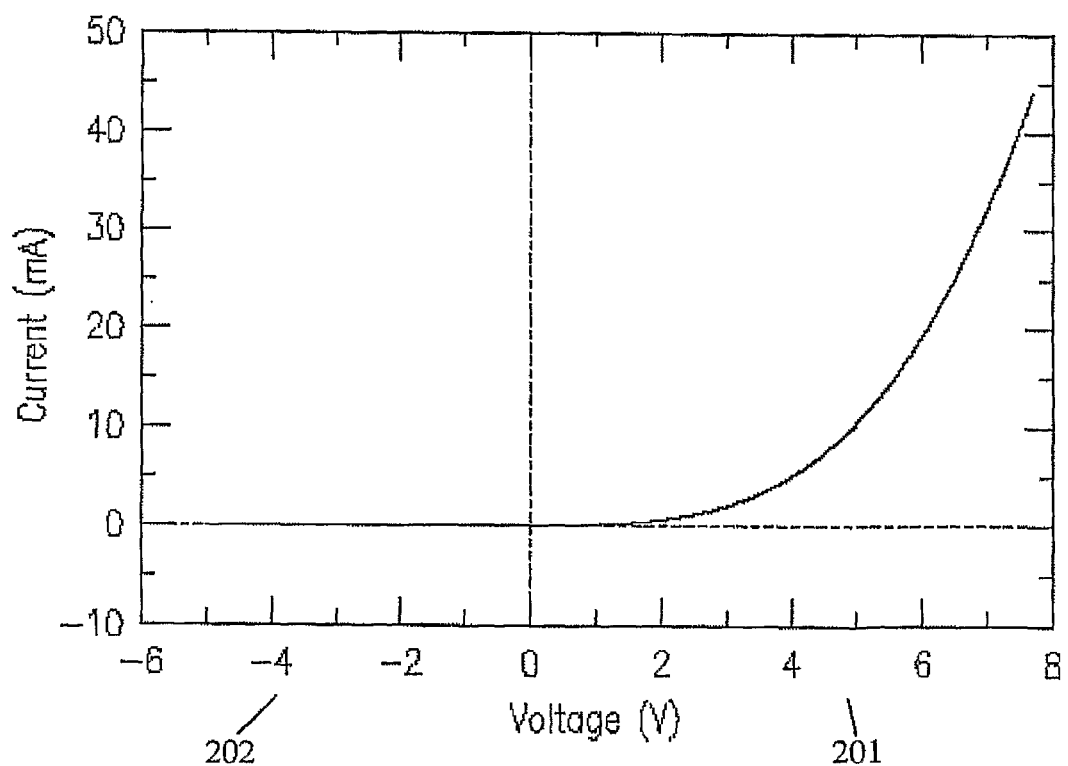
FIG. 2 shows typical IV characteristics of an LED.
Figure 3:
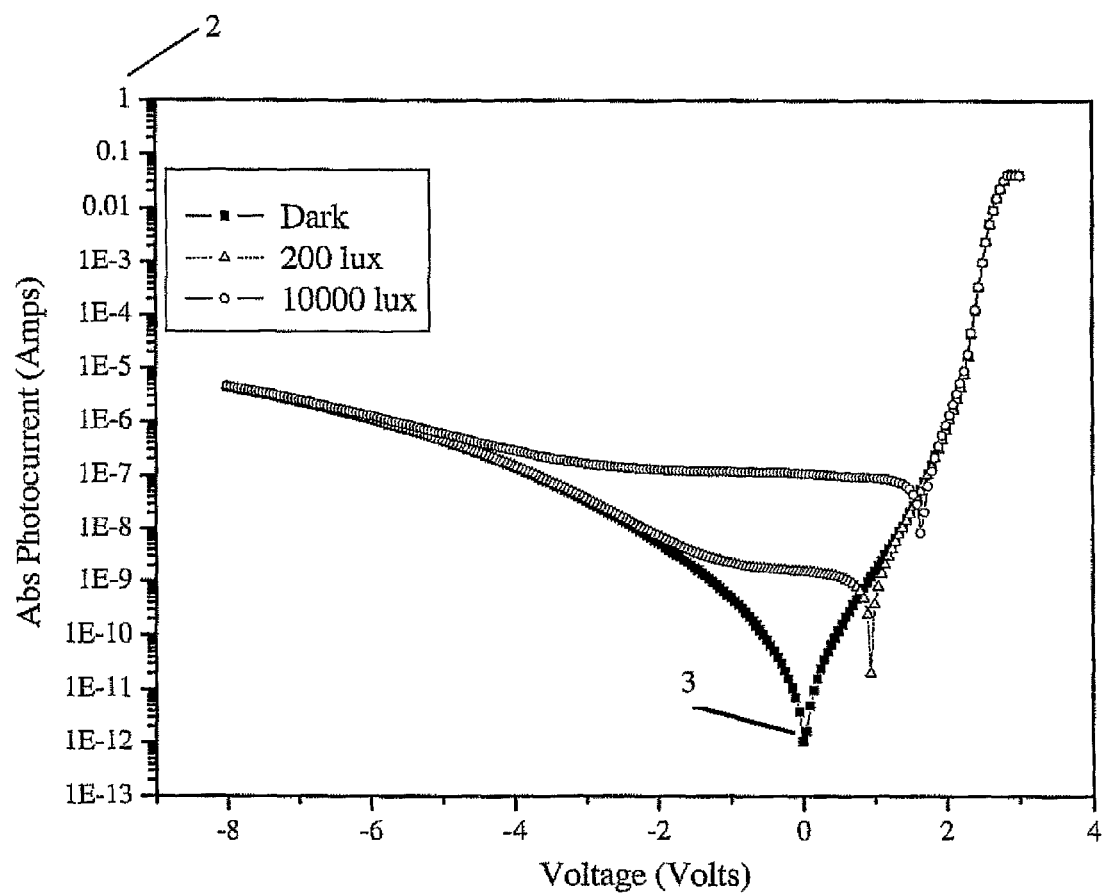
FIG. 3 shows measured photocurrent for a white LED at various bias voltages as a function of illumination light levels.
Figure 5:
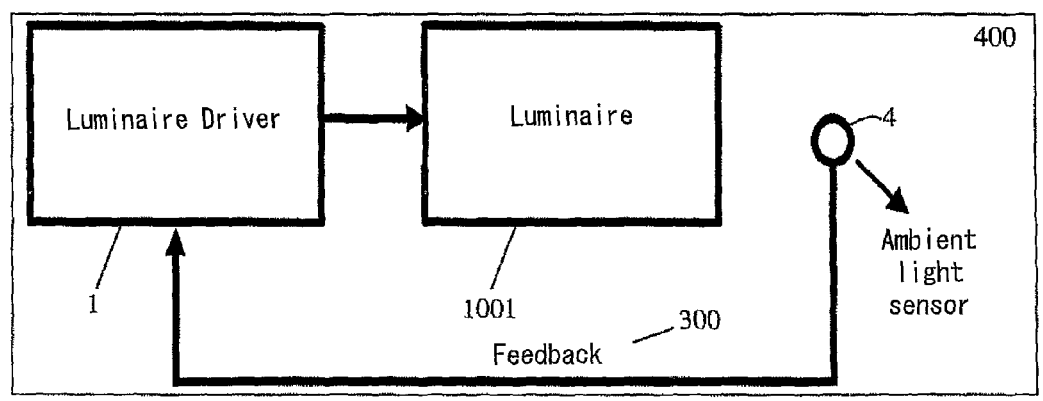
FIG. 5 is a schematic diagram showing conventional method of controlling luminaire output as per ambient conditions using an external photosensor.
Figure 6:
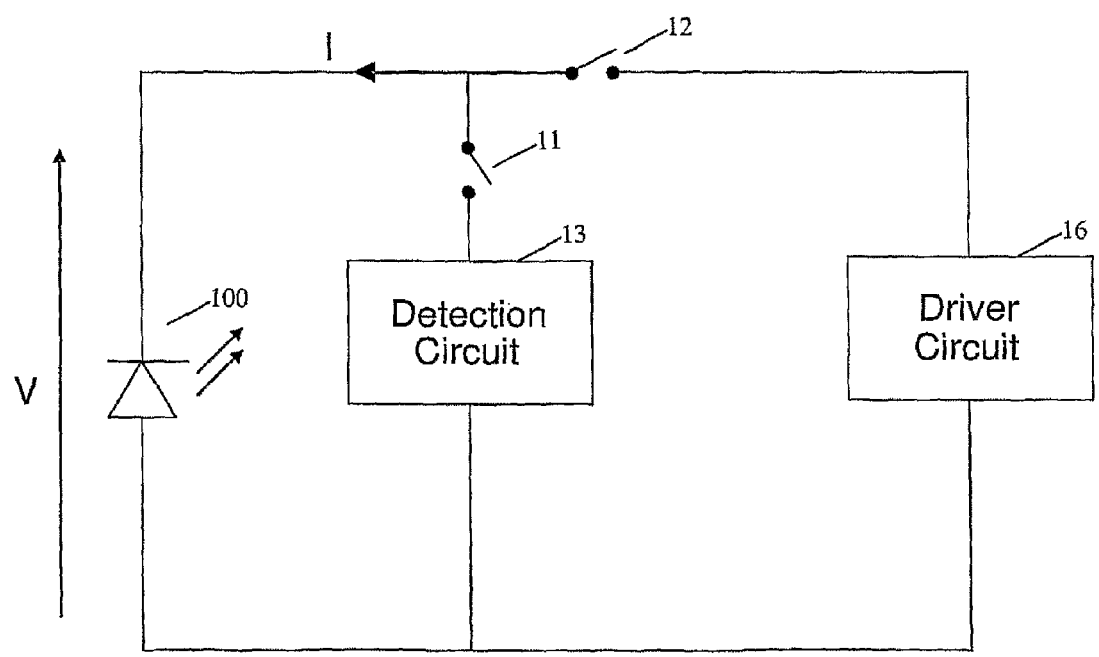
FIG. 6 is a block diagram of an illumination system operable in a drive mode or a detection mode.

FIG. 12 shows a schematic block diagram of a second embodiment of the invention, in which multiple LEDs can be arranged to act as both light emitters and detectors, in the general manner shown in FIG. 5.

FIG. 12 shows three LEDs 101, 102, 103 one of each of the three primary colours (red, green and blue), but the embodiment is not limited to this. It would also be possible to use fewer than three colours or to use more than three colours. Moreover, although FIG. 12 shows one LED of each colour, multiple LEDs of each colour can be used, arranged in either parallel or series to provide a desired output intensity. (References herein to a "blue LED", "green LED", etc, are intended to cover the case of a plurality of identical blue (or green, etc) LEDs connected so as to provide a desired output intensity in addition to the case of a single LED.) In a case where multiple LEDs of one colour are arranged in series, the bias voltages $V_1$ and $V_2$ are adjusted according to the number of LEDs in series.

The red LED(s) 103 can be made to operate in drive mode by closing switch 123 (to connect to drive circuit 163) and opening switch 113. They can be made to operate in detection mode by closing switch 113 (to connect to detection circuit 133) and opening switch 123. The green LED(s) 102 can be made to operate in drive mode by closing switch 122 (to connect to drive circuit 162) and opening switch 112. They can be made to operate in detection mode by closing switch 112 (to connect to detection circuit 132) and opening switch 122. The blue LED(s) 101 can be made to operate in drive mode by closing switch 121 (to connect to drive circuit 161) and opening switch 111. They can be made to operate in detection mode by closing switch 111 (to connect to detection circuit 131) and opening switch 121.

The operating modes of the red, green and blue LEDs can be controlled independently. For example, in the embodiment of FIG. 12 the driver circuits 161, 162, 163 are controlled by a Digital Processor (DP) 18.

FIG. 12 further shows a schematic control means 140 for controlling the states of the switches 111-113, 121-123, as indicated by the arrows 141, 142 extending from the control means 140 to the switches 123, 113 (arrows from the control means 140 to the remaining switches 111, 112, 121, 122 have been omitted from FIG. 12 for clarity). When it is desired for the red LED 103 to emit light, for example, the Digital Processor 18 would enable the driver circuit 163 for the red LED 103, and the control means 140 would close the switch 123 to connect the driver circuit 163 to the red LED 103. The driver circuit would accordingly drive the red LED to emit light. At the same time, the control means 140 would open the switch 113, to disable the detection circuit 133. Conversely, to operate the red LED 103 in detection mode, the control means 140 would open the switch 123 to disconnect the driver circuit 163 from the red LED 103, and would close the switch 113 to enable the detection circuit 133. At the same time, the Digital Processor 18 would preferably disable the driver circuit 163 for the red LED (although in principle it would be possible to control the emission from the red LED merely by opening or closing the switch 123 that connects the driver circuit 163 to the red LED).

The control means is preferably also able selectively to put each of the LEDs into an "inert" state, in which it neither emits light not acts as a detector.

In a practical implementation of the illumination system of FIG. 12, it would be possible for the Digital Processor 18 to perform the function of the control means 140, so that no separate control means 140 would be provided. The control means 140 has however been shown as a separate component in FIG. 12 for clarity of explanation.

When LEDs of a given colour(s) are operating in detection mode, the Digital Processor (DP) 18 is used to read the digitised outputs 253, 252, 251 of the measurement circuits. Since, as FIG. 4 shows, a coloured LED is sensitive in only a particular region of the spectrum, comparison of the output signals measured by the red, green and blue LEDs can be used to determine information regarding the power spectral density of the ambient illumination. The information is then passed over feedback loop 27 to the drive circuit which provides a dynamic illumination as per ambient requirements by regulating the bias voltage and/or pulse width applied to the LEDs in drive mode. The output from the LEDs can thus be made to depend on the determined spectrum, or the intensity and spectrum, of the ambient light, by selectively switching off one of more LEDs or by controlling the drive circuitry 163, 162, 161 by adjusting circuit 15.

The illumination system of FIG. 12 may also be used to determine the intensity of light output from the LEDs 101, 102, 103, as described in detail below.

The required drive pulse width/voltage may be determined in block 15.

In another embodiment of this invention a solid state illumination system is provided which automatically controls the white point of the illumination system and thus self-corrects the overall spectral output. This is done by synchronously switching off LEDs in turn so as to detect emission from other LEDs of the illumination system (which are driven to emit light) in a given timeframe. Here the relative colour sensitivity and photoresponsitivity curve of the individual LEDs can be tailored by modifying the penetration depth of the ambient light. This modification can be achieved by varying the depth of the active region from the top surface of the device (by epitaxially growing different material on top of device or using special packaging materials).

In the case of a lighting system (in for example a display backlight) that produces white light from three (or more) LEDs, for example from a red, a green and a blue LED, control of the relative brightnesses of the three LEDs, and thus the white point, is very important. This is because the red LED is typically of a different type (GaAs) to the green and blue LEDs (which are typically GaN or InGaN), and this means the dependence of emission properties on time, temperature etc., are very different between the red LED and the green and blue LEDs. Thus the colour or white-point control of such a set of LEDs, has required one or more additional photo-sensors (e.g. photodiodes). Typically three additional photo-sensors have been required so that individual control of red, green and blue components can be achieved.

In further embodiments of the invention, self-detection and control of the white point and colour of an illumination system with multiple LEDs can also be achieved without any separate photo-sensor. Control can be achieved either dependent on (by including a detection period in which all light sources are switched OFF to allow ambient light to be sensed), or independent of, ambient lighting conditions.

Consider an illumination system with three normal LEDs, one red, one green and one blue, to emit white light (for example, the system shown in FIG. 12). In detection mode the red LED can, in principle, measure, at a lower efficiency, the emission from the green and blue LEDs. This is because the green and blue photons are energetic enough to excite charge carriers in the red LED. This will be at a reduced efficiency as excitation across the conduction band away from the peak emission wavelength will have a lower efficiency and the LED package of the red LED is generally not optimised for green and blue transmission.

Similarly, the green LED can be excited by the blue LED. However, it is not generally possible for either a green or blue LED to be excited by a red LED, since the energy of photons from a red LED is not sufficient to excite carriers across the bandgap of a green or blue LED. For example, in the lighting system of JP-A-2006 260 927, the blue LED has an emission spectrum of approximately 430-460 nm, the green LED has an emission spectrum of approximately 500-570 nm, and the red LED has an emission spectrum of approximately 610-780 nm. The red LED of the lighting system of JP-A-2006 260 927 is therefore not able to excite carriers across the bandgap of the green or blue LED. Thus according to this aspect of the present invention, the emission spectrum of the LED with the smallest bandgap (eg the red LED of FIG. 12) overlaps the emission spectrum of the LED with the second-smallest bandgap (eg the green LED of FIG. 12).

Figure 13:
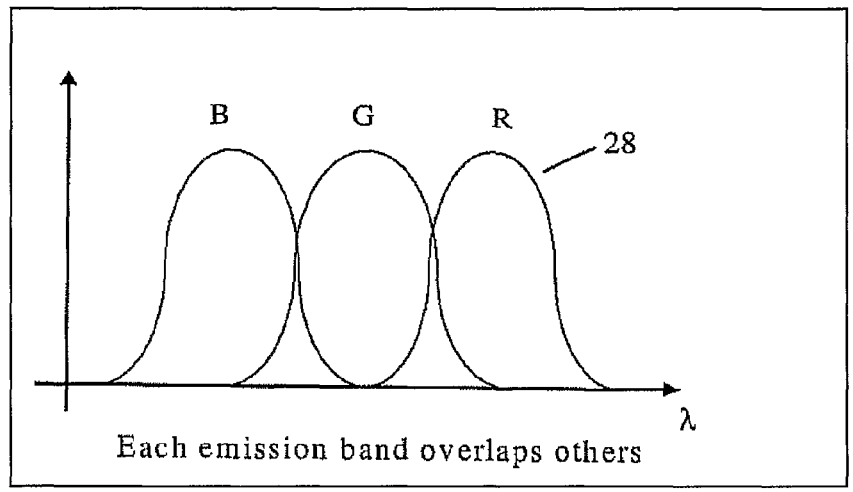
FIGS. 13 (a) and 13 (b) illustrate the driving mechanism for an embodiment using RGB LEDs where the emission band of the LEDs overlap each other.
Figure 13:
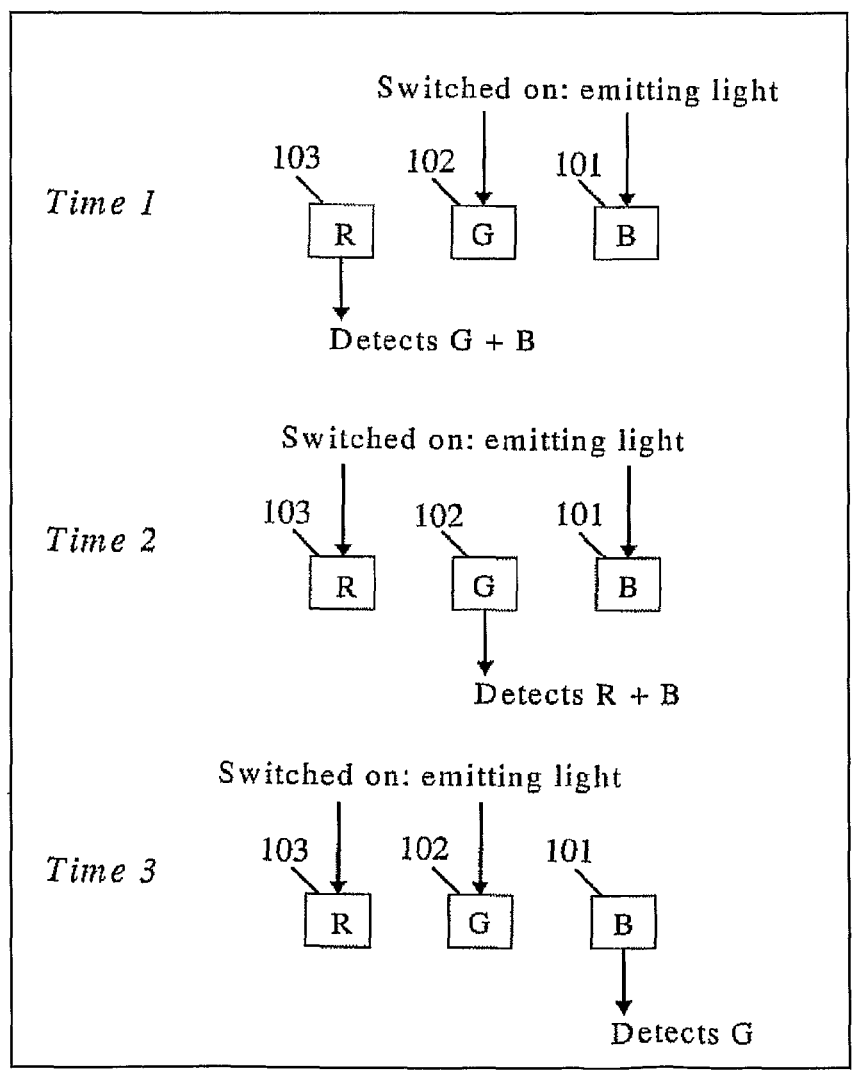

The structure of the illumination system of this embodiment is generally similar to that of FIG. 12. However, in this embodiment, as shown in FIG. 13(*a*), the blue and green LEDs are arranged so that their emission regions 28 overlap, and similarly the emission regions of the red and green LEDs overlap. The LED packages (ie, the packaging material encapsulating the LED active element) are also designed to admit a broad spectrum of light.

The LEDs are preferably controlled so that they all emit light for most of the time, and that the period (as described above) for which an LED is switched to detection mode is short, to minimise any reduction (flicker) in output from the illumination system. The neighbouring LEDs generally will be much brighter than the ambient light, so that light from the neighbouring LEDs generally will dominate the detected light level. (This is true for all embodiments described herein.)

(An optional stage of detecting ambient light, in which all of the LEDs are OFF, can be applied to this, and to the embodiments described below. This stage is not shown to preserve clarity of the self-correction schemes.)

FIG. 13(*b*) illustrates the operation of the three LEDs. In time period 1 the red LED is in detection mode, while the blue and green LEDs are driven to emit light. Thus in time period 1 the red LED 103 will record the intensity of light emitted by the blue and green LEDs. In time period 2, the green LED is in detection mode, while the blue and red LEDs are driven to emit light. Thus in time period 2 the green LED 102 will record the intensity of light emitted by the blue and red LEDs—in a prior art device the green LED would not record the intensity of light emitted by the red LED, but this is made possible in the present invention since the emission spectra of the red and green LEDs overlap one another. In time period 3 the blue LED is in detection mode, while the red and green LEDs are driven to emit light. Thus in time period 3 the blue LED 103 will record the intensity of light emitted by the green LED at a lower efficiency (since the emission/detection regions of the blue and green LEDs overlap) and the influence of the red LED on the intensity recorded by the blue LED will be negligible. The red LED can be turned off at this time to improve accuracy, but this is optional. In another time period the red, green and blue LEDs may all be driven to emit light, to provide a white light source.

From the intensities determined in time periods 1, 2 and 3, it is possible to determine (with calibration) the individual intensities of red, green and blue from the LEDs. If it is found that the overall light output from the illumination system does not have the desired colour balance, for example does not have the correct white point, the colour balance of the emitted light can be controlled by varying the brightness of one or more of the LEDs. Thus, the invention allows the intensity of light from each of the light sources to be determined, without needing a separate photodetector to determine the intensity of light from the red LED.

As the LEDs are very close to one another, the LED(s) that are ON will appear bright to the LED in detection mode, and the required integration time can be very short. The duration of the detection period is determined by the integration time, and so may be very short (for example <10 ms). (Keeping the duration of the detection period short minimises the risk that any flicker will be noticeable in the output.) The interval between two successive detections may be chosen to suit the requirements of the application—for example, the detection may be performed at video rates (eg, for active colour control), to once every hour (eg, for mood lighting), to once every switch-on time (eg, for a backlight), to once every week or month (eg, for colour drift detection). It is also possible for the detection process to be manually triggered. (This applies to all embodiments described herein.)

The illumination system of this embodiment may be switched between the mode in which the red LED is in detection mode, the mode in which the green LED is in detection mode, the mode in which the blue LED is in detection mode, and a mode in which the red, green and blue LEDs are all in emission mode by a suitable control means, for example similar to the control means 140 shown in FIG. 12, that is able to put each LED into emission mode, detection mode or neither mode. For example, the control means may be programmed to put the red LED into detection mode for a preset time, then put the green LED into detection mode for a preset time, then put the blue LED into detection mode for a preset time, and then put all the LEDs into emission mode. The duration of time periods 1, 2 and 3 need only be as long as required to obtain an accurate measurement of the emission from the other LEDs and, as explained above, is preferably kept short to avoid flicker in the output from the illumination system. The duration of the time period 1, time period 2 and time period 3 may typically be 10 ms or below.

The control means may also be programmed to carry out detection of light intensity, by sequentially putting the LEDs into detection mode at, for example, predetermined intervals as described above or every time that the illumination system is switched on.

Figure 14:
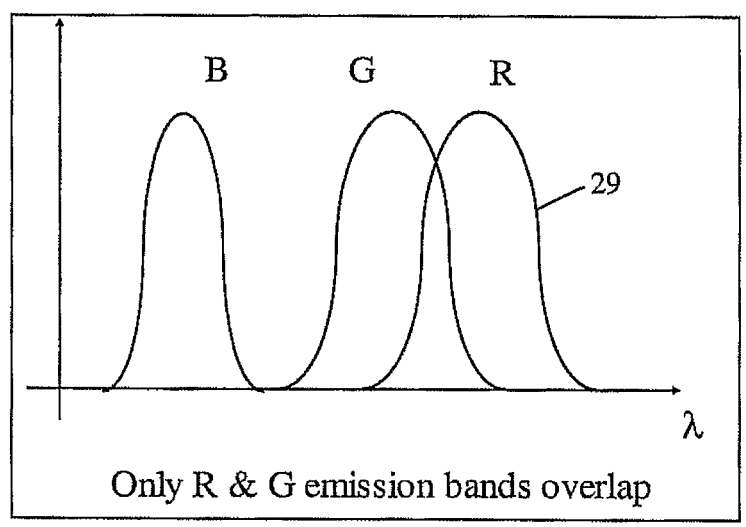
FIGS. 14(a) and 14(b) illustrate the driving mechanism for an embodiment using RGB LEDs where the emission band of the Red and Green LEDs overlap each other.

FIGS. 14(*a*) and 14(*b*) illustrate another embodiment of the invention. This embodiment is similar to the embodiment of FIGS. 13(*a*) and 13(*b*) except that it is not required that the emission regions of the green and blue LEDs overlap. As shown in FIG. 14(*a*), there is an overlap 29 only between the emission regions of the red and green LEDs. If the emission spectra of two LEDs are overlapping, this has the effect of producing a smaller controllable colour gamut over which the colour of the lamp can be controlled. This is not an issue in the case of a simple white point control. This effect is reduced in the embodiment of FIGS. 14(*a*) and 14(*b*) compared to the embodiment of FIGS. 13(*a*) and 13(*b*), since the emission regions of the green and blue LEDs do not overlap in the embodiment of FIGS. 14(*a*) and 14(*b*).

FIG. 14(*b*) illustrates operation of this embodiment. Time periods 1 and 2 of FIG. 14(*b*) correspond to time periods 1 and 2 of FIG. 13(*b*), and detect the intensity of green+blue light and the intensity of red+blue light respectively.

In time period 3, either the red or green LED is switched to detect with the other of the red and green LEDs driven to emit light. The blue LED is switched off in time period 3, ie it is not used as a light sensor and it is not driven to detect light. Thus, either the intensity of green light or the intensity of red light is detected in time period 3. In another time period, the red, green and blue LEDs may all be driven to emit light, to provide a white light source.

From the intensities determined in time periods 1, 2 and 3, it is possible to determine (with calibration) the individual intensities of red, green and blue from the LEDs. The colour balance of the light output from the illumination system may be checked, and if necessary corrected, as described above.

FIGS. 15(*a*) and 15(*b*) show, for an illumination system according to another embodiment of the invention, the emission spectra of the light sources and the operation of the light sources in detection mode. The illumination system itself corresponds generally to the illumination system shown in FIG. 12, except that there are four independently controllable LEDs (or other light sources). The additional LED is not a photo-sensor alone, as in the prior art, but also emits light and contributes to the brightness of the system. The LEDs are one blue 101, one green 102 and two red LEDs 1031, 1032. The emission wavelengths of the red, green and blue LEDs are not required to overlap, thus preserving colour gamut. The LEDs with the smallest and second-smallest bandgaps—namely, the two red LEDs—have different emission spectra, but their emission spectra are required to have significant overlap 30.

As there are four LEDs, there need to be four measurements to determine the intensities of the four LEDs and thus allow control of the four LEDs. In time period 1 the green LED is in detection mode, while the other LEDs are driven to emit light. Thus in time period 1 the green LED will record the intensity of light emitted by the blue LED. The red LEDs may be driven in time period 1 in FIG. 15(*b*), even though their output cannot be detected by the green LED, so as to minimise disruption to the output emission (although they could in principle be switched off). The illumination system is still operating as an illumination system while the detection process is going on. By keeping the red LEDs ON it is possible to reduce the chance that a flicker in the output is seen (although if the detection periods are kept short it is anyway unlikely that flicker will be noticeable) and to maintain the brightness of the output.

In time period 2, one of the red LEDs is in detection mode, while the blue and green LEDs are driven to emit light. The other red LED is switched off, ie is not in detection mode and is not driven to emit light. Thus in time period 2 the red LED in detection mode will record the intensity of light emitted by the blue and green LEDs.

In time period 3 one of the red LEDs is in detection mode while the other red LED and the green and blue LEDs are driven to emit light. Thus, if red LED R2 is in detection mode it will record the intensity of light emitted by the blue and green LEDs and by the other red LED R1.

Finally, in time period 4 the red LED that was in detection mode in time period 3 is switched to emit light while the red LED that driven to emit in time period 3 is switched to detection mode. Thus, if red LED R2 was in detection mode in time period 3 then in time period 4 red LED R1 is in detection mode and it will record the intensity of light emitted by the blue and green LEDs and by the other red LED R2.

(For the reasons given above, it is preferable that the green and blue LEDs are driven in time period 3 or 4 to minimise disruption to the output of the illumination system.)

In another time period, the blue LED, the green LED and the two red LEDs may be driven to emit light, to provide a white light output. From the intensities determined in time periods 1, 2, 3 and 4, it is possible to determine (with calibration) the individual intensities of red, green and blue light from the LEDs. The colour balance of the light output from the illumination system may be checked, and if necessary corrected, as described above.

Figure 16:
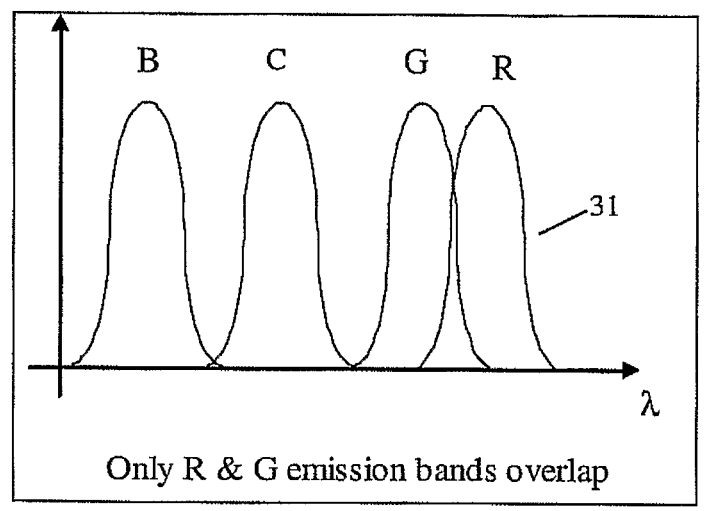
FIGS. 16(a) and 16(b) illustrate the driving mechanism for an embodiment using RGCB LEDs where the green and cyan LEDs used are such that their emission bands overlap each other.
Figure 16:
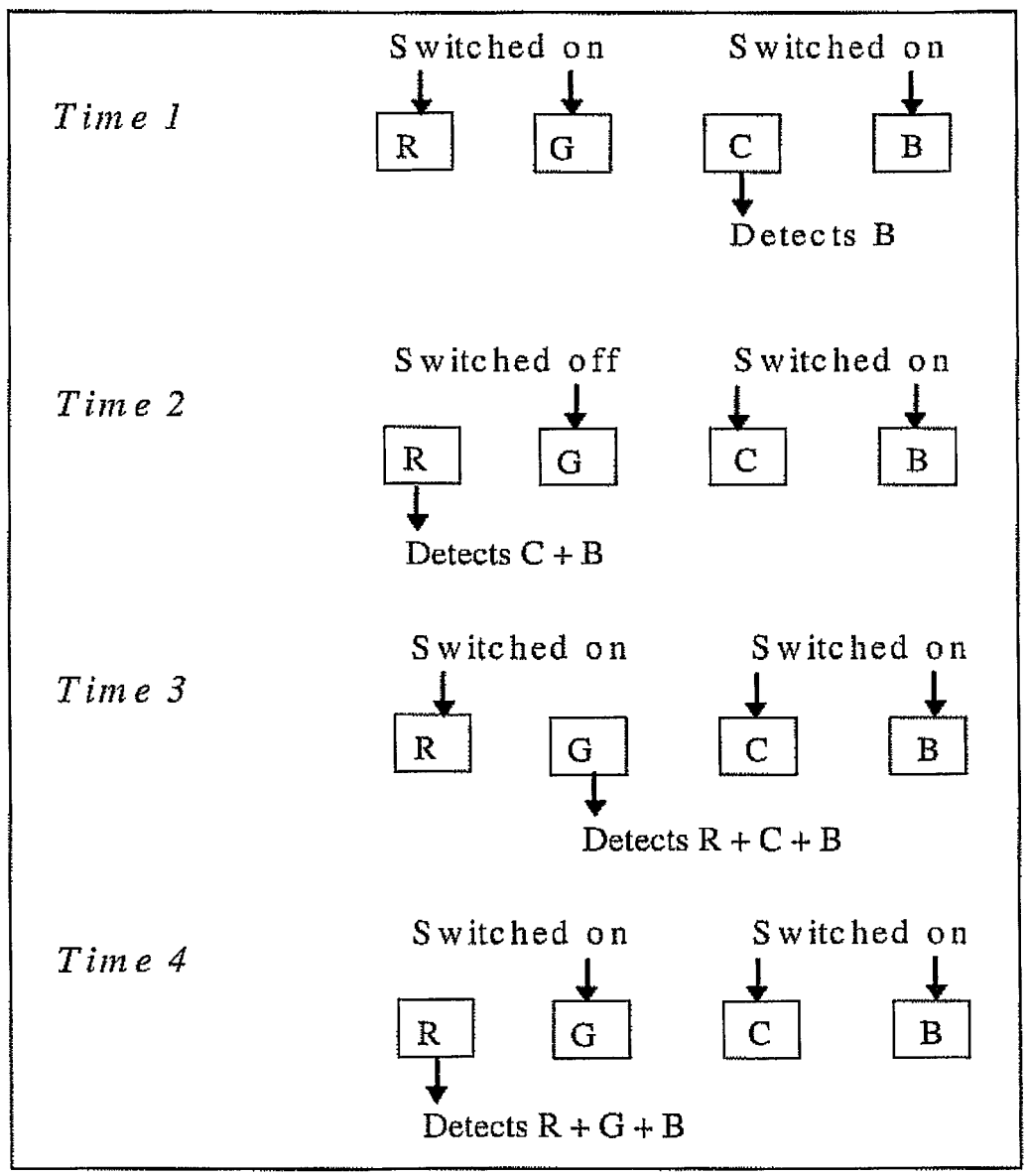

FIGS. 16(*a*) and 16(*b*) show, for an illumination system according to another embodiment of the invention, the emission spectra of the light sources and the operation of the light sources in detection mode. The illumination system itself corresponds generally to the illumination system of FIGS. 15(*a*) and 15(*b*) in that there are four independently controllable LEDs (or other light sources). The additional LED is not a photo-sensor alone, as in the prior art, but also emits light and contributes to the brightness of the system.

In the particular embodiment of FIGS. 16(*a*) and 16(*b*) the four light sources are a blue LED 101, a cyan LED 104, a green LED 102 and a red LED 103. The embodiment is not limited to these four specific LEDs and, in principle, any four LEDs of different emission characteristics may be used. The only requirement is that the two longest wavelength LEDs have a significant overlap 31 in emission spectra, and thus in absorption spectra. Thus the four LEDs can be controlled using the same scheme as in FIGS. 15(*a*) and 15(*b*).

In time period 1 the LED with the second-shortest emission wavelength is used as light sensor, while the other LEDs are driven to emit light. Thus in time period 1 the LED with the second-shortest emission wavelength will record the intensity of light emitted by the LED with the shortest emission wavelength. In the example of FIG. 16(*a*) the LED with the second-shortest emission wavelength is the cyan LED, and this is used as light sensor; it records the intensity of light emitted by the blue LED. (Again, to maintain the output of the illumination system, it is preferable that the other LEDs are driven in time period 1 in FIG. 15(*b*), even though their output cannot be detected by the green LED.)

In time period 2, the LED with the longest emission wavelength is used as light sensor, the LED with the second-longest emission wavelength is switched off, and the other LEDs are driven to emit light. Thus in time period 2 the LED with the longest emission wavelength will record the intensity of light emitted by the two LEDs with the shortest and second-shortest emission wavelength. In the example of FIG. 16(*a*) the LED with the longest wavelength is the red LED, and this is used as light sensor in time period 2; it records the intensity of light emitted by the cyan and blue LEDs.

In time period 3 the LED with the second-longest emission wavelength is in detection mode while all other LEDs are driven to emit light. The LED with the second-longest emission wavelength will detect light from all other LEDS, since its emission spectrum overlaps with the emission spectrum of the LED with the longest emission wavelength. In the example of FIG. 16(*a*) the LED with the second-longest wavelength is the green LED, and this is used as light sensor in time period 3; it records the intensity of light emitted by the red, cyan and blue LEDs.

Finally, in time period 4 the LED with the longest emission wavelength is in detection mode while all other LEDs are driven to emit light. The LED with the longest emission wavelength will detect light from all other LEDS. In the example of FIG. 16(*a*) the LED with the longest wavelength is the red LED, and this is used as light sensor in time period 4; it records the intensity of light emitted by the green, cyan and blue LEDs.

(Again, to maintain the output of the illumination system, it is preferable that the C and B LEDs are driven in time period 3 or 4.)

In another time period, the blue, green and red LEDs may be driven to emit light, to provide a white light output. From the intensities determined in time periods 1, 2, 3 and 4, it is possible to determine (with calibration) the individual intensities of red, green and blue light from the LEDs. The colour balance of the light output from the illumination system may be checked, and if necessary corrected, as described above.

The embodiment of FIGS. 16(*a*) and 16(*b*) may be generalised, for example to allow for more than four LEDs. The generalisation is for X LEDs, where the emission/detection characteristics of the two longest wavelength LEDs overlap with one another. It is not necessary that the emission/detection characteristics of the other LEDs overlap (and this will provide the greatest colour gamut), but it is also not necessary for them not to overlap. LED 1 has the shortest wavelength, LED N has a longer wavelength than LED (N−1) and LEDs (X−1) and X have the longest wavelengths and have overlapping emission wavelengths ranges. Since there are X LEDs, X (or more) measurements are required to determine the intensity of light from each LED. One possible sequence of steps is as follows:

a) LED 2 is switched off and detects LED 1. LED 3, etc. need be switched off only if they overlap LED 2's detection range.

b) LED 3 is switched off and detects LED 1 and 2. LED 4, etc. need be switched off only if they overlap LED 3's detection range.

c) This is continued up to and including LED X. In general, in an nth time period, the spectral distribution of light from the first to nth LEDs is sensed using the (n+1)th LED as a photosensor until, in the (X−1)th step the spectral distribution of light from the first to (X−1)th LEDs is sensed using the Xth LED as a photosensor.

All LED brightnesses may thus be determined except for LED X.

LED (X−1) is then made detecting with LED X on. It does not matter if the other LEDs are on or off, as their brightnesses (and effect on LED (X−1) with LED X off) are known (as explained, the other LEDs are preferably kept ON, to minimise flicker in the output).

Thus there are X measurement steps for X LEDs.

In other time periods, all X LEDs may be driven to emit light.

The order of the steps may be varied from the order given above. Moreover, the invention is not limited to these steps provided that there are X (or more) measurements that allow the spectral distribution of each of the X light sources to be identified.

For example, it is not necessary that the (N+1)th LED is used to detect the emission from the Nth LED. In principle, emission from an LED may be detected by any of the other LEDs that has a longer emission wavelength. (The possibility that LEDs other than the (X−1)th and Xth LEDs have emission spectra that overlap is not considered, for simplicity—but if the emission characteristics of other LEDs overlap, measurement of the emission from an LED would not be limited to use of other LEDs having longer emission wavelength as detectors.) In principle, emission from LED 1 may be detected by any of LED 2 to LED X, emission from LED 2 may be detected by any of LED 3 to LED X, and so on. However, the scheme proposed above has the advantage that, in each time period, only the LED that is in detection mode (assuming that only LED (X−1) and LED X have overlapping emission characteristics) is required not to emit light—so that the reduction in output from the illumination system is kept to a minimum. In this connection it will be noted that if, as an example, LED 3 is used to detect emission from LED 1, either LED 3 will record the combined emission from LED 1 and LED 2, or it will be necessary to switch LED 2 OFF in order to record only the emission from LED 1.

Figure 17B:
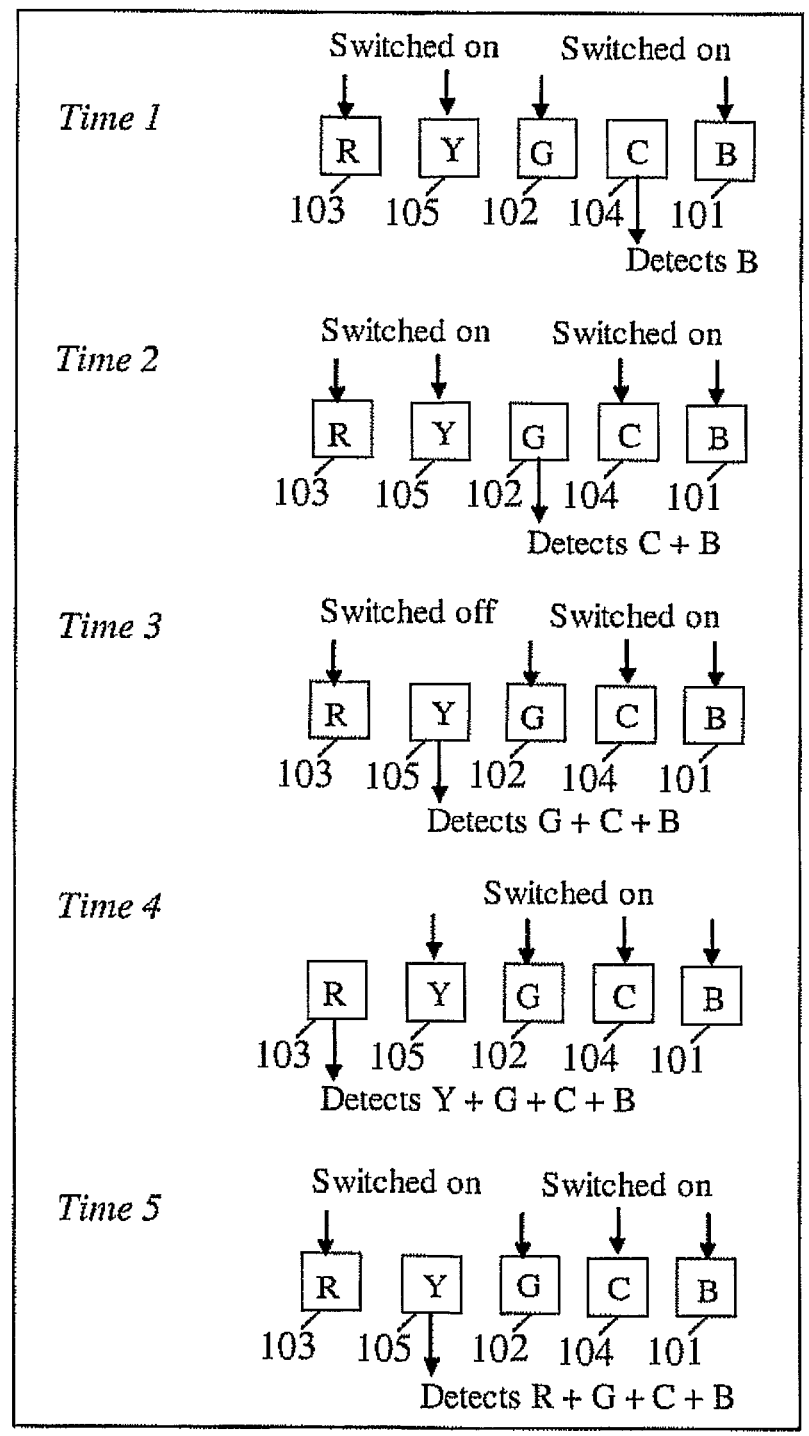

As a further example: five or more LEDs (or other light sources) may be used, provided that the emission spectra of the two longest wavelength LEDs overlap one another. (It is possible that others of the emission spectra may also overlap one another.) This is illustrated with reference to FIGS. 17(*a*) and 17(*b*). FIG. 17(*a*) shows (compared to FIG. 16(*a*)) an additional yellow LED 105. The emission spectrum of the yellow LED overlaps the emission spectrum of the red LED. The minimum number of measurement steps required is equal to the number of LEDs—so that five measuring steps are needed for an embodiment in which five LEDs are used.

FIG. 17(*b*) shows one possible sequence of measuring steps for the five LEDS of FIG. 17(*a*).

In time period 1 the LED with the second-shortest emission wavelength is used as light sensor, while the other LEDs are driven to emit light. Thus in time period 1 the LED with the second-shortest emission wavelength will record the intensity of light emitted by the LED with the shortest emission wavelength. In the example of FIG. 17(*a*) the LED with the second-shortest emission wavelength is the cyan LED, and this is used as light sensor; it records the intensity of light emitted by the blue LED.

In time period 2 the LED with the third-shortest emission wavelength is used as light sensor, while the other LEDs are driven to emit light. Thus in time period 2 the LED with the third-shortest emission wavelength will record the intensity of light emitted by the LEDs with the shortest and second-shortest emission wavelengths. In the example of FIG. 17(*a*) the LED with the third-shortest emission wavelength is the green LED, and this is used as light sensor in time period 2; it records the intensity of light emitted by the blue and cyan LEDs.

In time period 3, the LED with the second longest emission wavelength is used as light sensor, the LED with the longest emission wavelength is switched off, and the other LEDs are driven to emit light. Thus in time period 3 the LED with the second longest emission wavelength will record the intensity of light emitted by the three LEDs with the shortest, second-shortest and third-shortest emission wavelength. In the example of FIG. 17(*a*) the LED with the second-longest wavelength is the yellow LED, and this is used as light sensor in time period 3; it records the intensity of light emitted by the green, cyan and blue LEDs.

In time period 4 the LED with the longest emission wavelength is in detection mode while all other LEDs are driven to emit light. The LED with the longest emission wavelength will detect light from all other LEDS. In the example of FIG. 17(*a*) the LED with the longest wavelength is the red LED, and this is used as light sensor in time period 4; it records the intensity of light emitted by the yellow, green, cyan and blue LEDs.

Finally, in time period 5 the LED with the second-longest emission wavelength is in detection mode while all other LEDs are driven to emit light. The LED with the second longest emission wavelength will detect light from all other LEDs, since its emission spectrum overlaps with the emission spectrum of the LED with the longest emission wavelength. In the example of FIG. 17(*a*) the LED with the second-longest wavelength is the yellow LED, and this is used as light sensor in time period 5; it records the intensity of light emitted by the red, green, cyan and blue LEDs.

It should be noted that the various driving schemes shown in FIGS. 13(*b*) to 17(*b*) may be varied from those shown. In particular, the order of the time periods is not limited to the orders shown. Moreover, the invention is not limited to the exact steps shown. In an illumination system with X light sources, it is in principle possible to determine the individual intensities of all light sources provided that X different combinations of intensities are measured. Moreover, in the schemes of FIGS. 15(*b*)-17(*b*) the two longest wavelength LEDs could be interchanged—in step 3 of FIG. 17(*b*), for example, detecting with the red LED with the yellow LED off, would give the same results as that shown.

The illumination system of this aspect of the invention has been described specifically with reference to embodiments having LEDs with three or more different emission spectra so as to provide a white light output. The invention is not, however, limited to such illumination systems. As an example, it is known to provide a broad wavelength output, for example a white light output, by using one or more LEDs to excite a material or mixture of materials that, when excited, re-emits light over a broad wavelength range. This may be achieved, for example, by using a blue LED to excite suitable phosphors or other such materials.

An illumination system of this type may, according to the principles of the invention, be provided with (at least) two blue LEDs, having emission characteristics to one another that are different but that overlapping. In normal operation, both blue LEDs are driven to emit light. However, the output intensity of the illumination system may be checked by driving one blue LED to emit light while putting the other blue LED in detection mode. A blue LED can act as an emitter, and as a detector addressing just one part of the ambient spectra (as the responsivity curve of a blue LED does not cover the whole visible spectrum). However, there are applications where the change in output intensity light is more prominent in the blue spectral region, and this embodiment is particularly useful for these. For example, this embodiment could be very useful in an LED flashlight for a mobile camera.

An illumination system of this type is also able to detect the intensity of ambient light, by putting one blue LED in detection mode while the other LED(s) are not driven to emit light. Again, there are applications where the change in the ambient light is more prominent in the blue spectral region so that detection of ambient light intensity in the blue spectral region is sufficient.

Embodiments of the invention have been described with reference to LEDs as the light sources. The invention is not limited to LEDs, however, and an illumination system of the invention may have light sources other than LEDs.

In an illumination system of the invention, the extent of overlap between the emission spectrum of the red LED and the emission spectrum of the green LED (or, in general terms, the overlap between the emission spectrum of the light source with the smallest bandgap and the emission spectrum of the light source with the second-smallest bandgap) is required to be sufficient so that, when the green LED is in detection mode and the red LED is driven to emit light, the green LED generates a detectable current that, using available current measuring techniques, can be measured with sufficient accuracy to allow an accurate determination of the output intensity from the red LED (or, in general terms, when the light source with the second-smallest bandgap is in detection mode and the light source with the smallest bandgap is driven to emit light, the light source with the second-smallest bandgap generates a detectable current that, using available current measuring techniques, can be measured with sufficient accuracy to allow an accurate determination of the output intensity from the light source with the smallest bandgap). Preferably, the output from the red LED (or, in general terms the output from the light source with the smallest bandgap) is capable of being measured with a similar degree of accuracy to the outputs from the other light sources, so that an accurate measurement of the overall output spectrum of the illumination system can be made.

The extent of overlap between the emission spectrum of the light source with the smallest bandgap and the emission spectrum of the light source with the second-smallest bandgap may be dependent on the light-transmission properties of the packaging material surrounding the active elements light sources. The greater the amount of light from the light source with the smallest bandgap that is absorbed by the packaging material, the greater the degree of overlap between the emission spectra that is required to obtain a detectable current at the light source with the second-smallest bandgap. As noted above, it may be preferable for the packaging material encapsulating the LED active elements to have a broad transmission spectrum, to minimise absorption in the packaging material.

Figure 7:
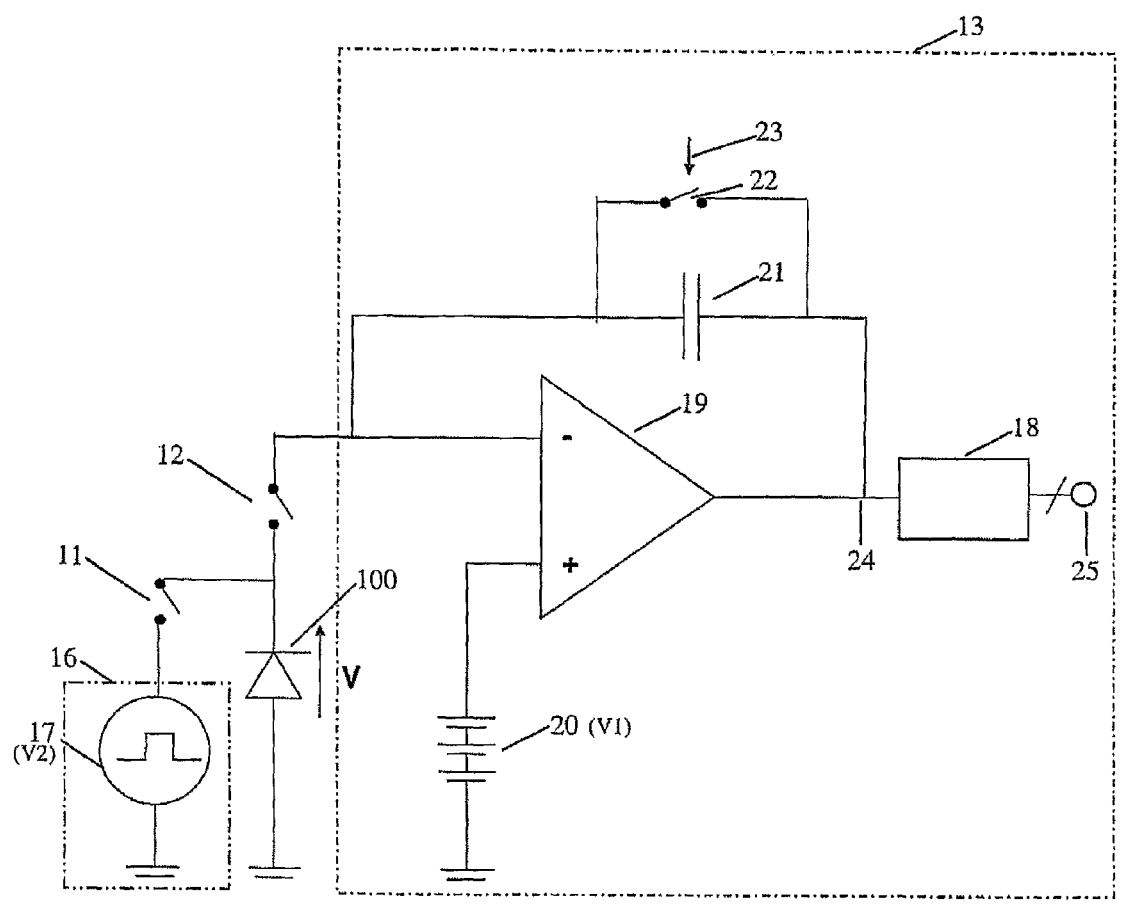
FIG. 7 is a block diagram of another illumination system operable in a drive mode or in a detection mode.
Figure 8:
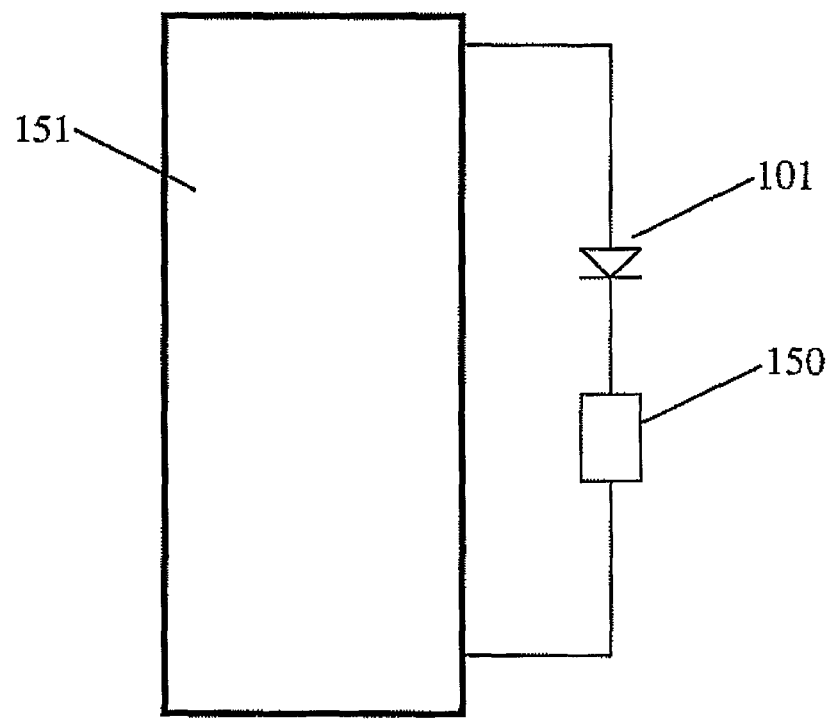
FIG. 8 is a block diagram of an automatic backlight system.
Figure 9:
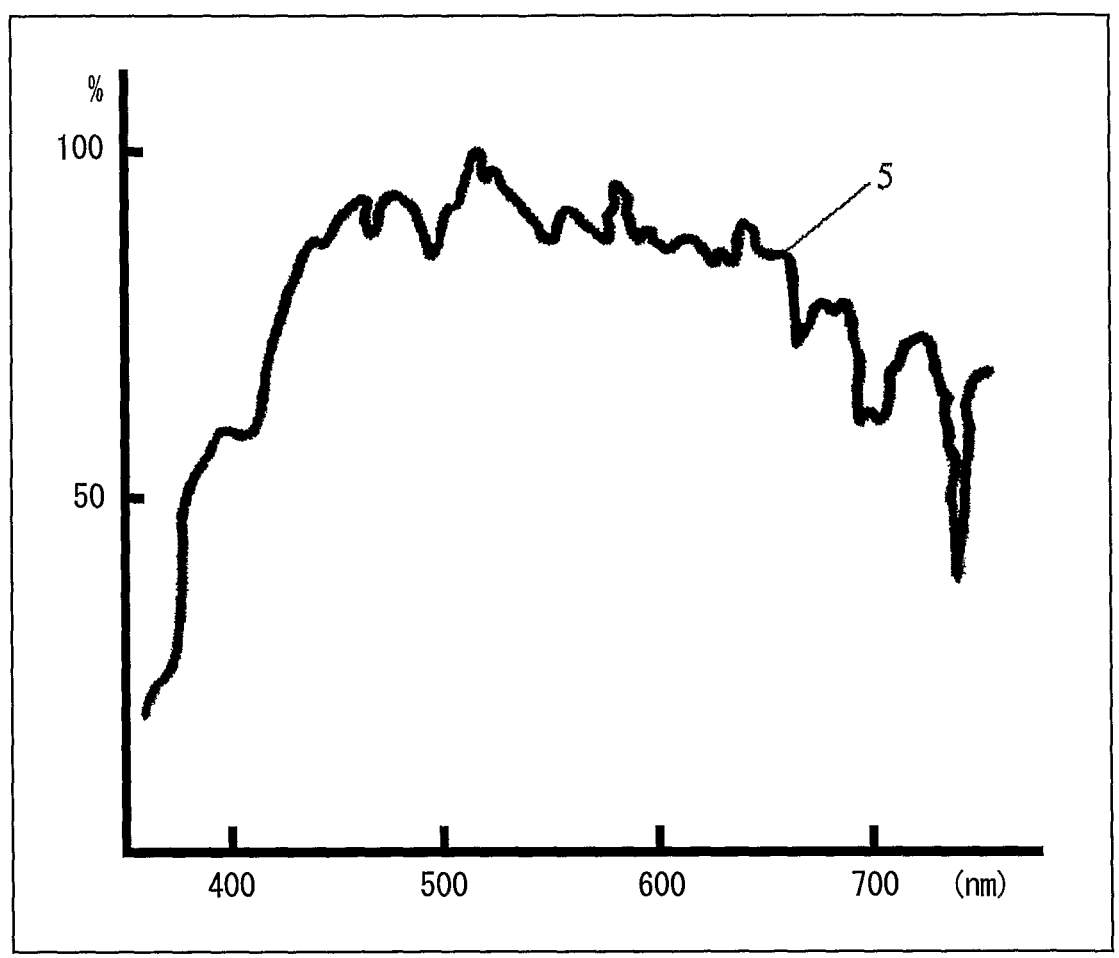
FIG. 9 shows spectral power distribution of noon sunlight in the visible wavelength range.
Figure 10:
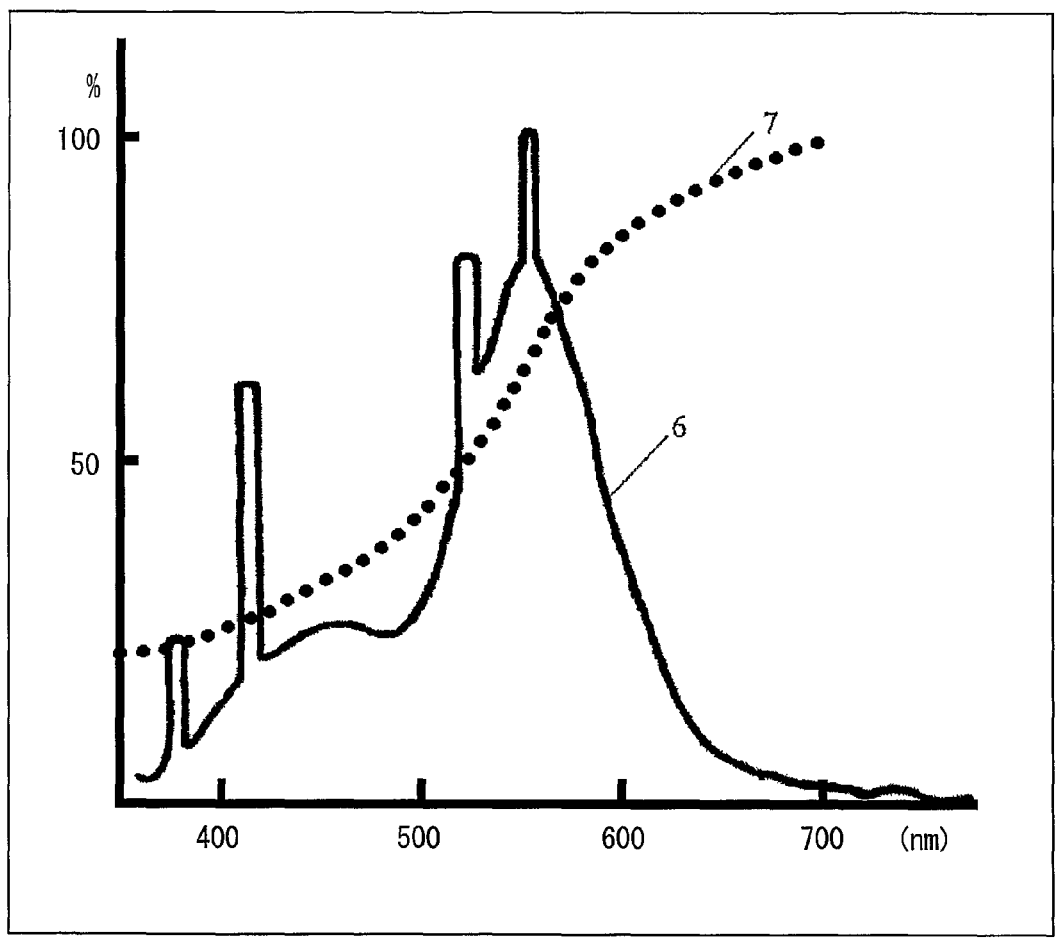
FIG. 10 shows spectral power distributions of a fluorescent lamp (solid line) and a tungsten bulb (dotted lines) in the visible wavelength range.

An illumination system of the invention comprises suitable detection circuitry for detecting the output current from a light source in detection mode. Preferably, each light source may have an associated detection circuit, in the manner shown generally in FIG. 12, with the outputs of the detection circuits being passed to a processor for determination of the output spectrum of the illumination system and comparison with a target output spectrum. A detection circuit may, for example, be a detection circuit as shown in FIG. 7.

In the description of the above embodiments it has been assumed that the LED (or other light source) used as a light sensor accurately detects the ambient light (or the light from other light sources of the illumination system). This assumption is reasonable in some cases such as, for example, a camera flash light. It may not however be reasonable where an illumination is used as a backlight for a display, since ambient light reaching the light source being used as the light sensor must pass through the display—and so the detected intensity and colour balance may be affected by an image display by the display. Where an illumination system of the invention is used as a backlight for a display, it may be necessary to arrange for the display to be made maximally transmissive whenever the ambient light spectral distribution is to be measured.

Another aspect of the present invention therefore provides an illumination system having a waveguide configured to allow ambient light to reach the light source being used as the light sensor without passing through a display that is illuminated by the illumination system. In this embodiment the large reduction in brightness caused by ambient transmission through the LC display, and the reduction being dependent on what is being shown on the display can be circumvented. This modification will also mean that the display need not be switched transparent (with subsequent loss in picture quality) when an ambient measurement need be taken.

Figure 18:
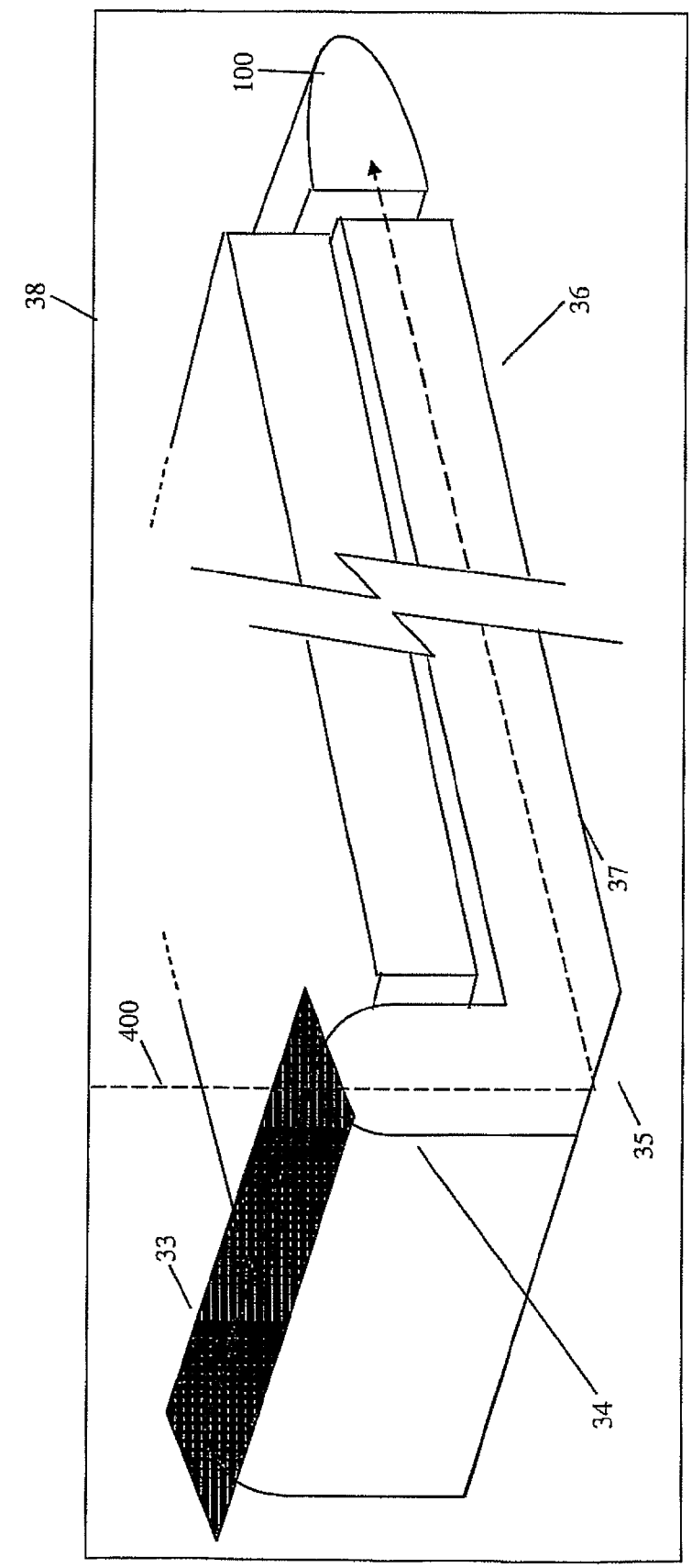
FIG. 18 is a schematic diagram of an illumination system according to the embodiment of the invention having a waveguide configured to couple ambient light into the LEDs bypassing the active part of an LCD.

This embodiment is shown in FIG. 18. Light from the light-emitting unit 100 of the illumination system enters a light-guide 36 through one end face of the light-guide. According to the invention, an additional feature is provided at the end of the light-guide 36 opposite the light-emitting unit 100. Here the Light-guide 36 extends at approximately right angles to the main body of the light-guide, using a 45 degree angled mirror 35, to a lenticular convex lens end point 34. The upper surface of the main body of the light-guide forms a light-emission surface and, in use, a display to be illuminated is placed opposite the light-emission surface of the waveguide. The light guide is arranged such that the end point 34 is above the front surface of the display 38 being illuminated, and able to gather ambient light 400. A diffuser 33 may optionally be provided above the lens end 34.

FIG. 18 shows the light guide 36 extending at approximately right angles to the main body of the light-guide, and in many applications this is preferred for aesthetic reasons. However, the invention is not limited to this, and the light guide 36 may extend at any desired angle to the main body of the light-guide.

The extended part of the light-guide runs the whole width of the light-guide and bypasses the LCD and other components for ambient light from outside. Ambient light that passes through the display is strongly attenuated by the display, polarisers and films, and depends on the extraction features 37 of the light-guide to couple the light towards the LEDs. In this embodiment, ambient light is coupled directly into the end of the light-guide through the lens end point 34, and the diffuser 33 if present. Light entering the light-guide at the lens end point 34 is guided to the light-emitting unit 100, and so reaches the light source acting as a light sensor without passing through the display 38.

The open area of the end point 34 of the light-guide is smaller than the whole area of the display, but with proper design on a typical display and backlight, it has been modelled that 10 times more light is coupled to the LEDs through this method than by direct transmission through the display.

Light-guides typically have extraction features on their surfaces to out-couple light from the LEDs out of the light-guide. These features will be a source of loss for the system. In addition light from the LEDs that is not out-coupled from the light-guide can exit the light-guide here, however proper design of the diffuser should minimise this, and the light should be largely extracted before this part of the light-guide.

It is possible to redesign the extraction features in the light-guide to reduce this loss with the effect of increasing light lost through the lens end of the light-guide.

For a fuller understanding of the nature and advantages of the invention, reference should be made to the ensuing detailed description taken in conjunction with the accompanying drawings.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. An illumination system comprising: one or more light sources for emitting visible light; a detection circuit for sensing a light intensity using at least one of the light sources as a photosensor; driving means for driving the light source(s) in dependence on the sensed light intensity; and a light guide for receiving light from the light source(s);

wherein the light guide has a first portion main body coplanar with an object to be illuminated separate from the detection circuit for light emission to the object to be illuminated and a second portion different from the first portion and non-coplanar relative to the first portion for receiving ambient light, the light guide being so configured such that, in use, the object to be illuminated does not cover the second portion of the light guide, and the second portion extends from the main body of the light guide so as not to be covered by the object to be illuminated; and wherein the second portion is optically integral with the first portion such that light passes directly between the first portion and the second portion, and the light source that is used as the photosensor is configured to illuminate the first portion of the light guide and the object to be illuminated.

2. A display comprising:

an image display panel, and an illumination system for illuminating the image display panel, the illumination system comprising one or more light sources for emitting visible light; a detection circuit for sensing a light intensity using at least one of the light sources as a photosensor; driving means for driving the light source(s) in dependence on the sensed light intensity; and a light guide for receiving light from the light source(s);

wherein the light guide has a first portion main body coplanar with the display panel for light emission and a second portion different from the first portion and non-coplanar relative to the first portion for receiving ambient light, the light guide being so configured such that, in use, the image display panel does not cover the second portion of the light guide, and the second portion extends from the main body of the light guide so as not to be covered by the image display panel; and wherein the second portion is optically integral with the first portion such that light passes directly between the first portion and the second portion, and the light source that is used as the photosensor is configured to illuminate the first portion of the light guide and the display panel.

3. A display as claimed in claim 2, wherein the image display panel is disposed adjacent to the first portion of the light guide.

4. A flashlight comprising an illumination system including one or more light sources for emitting visible light; a detection circuit for sensing a light intensity using at least one of the light sources as a photosensor; driving means for driving the light source(s) in dependence on the sensed light intensity; and a light guide for receiving light from the light source(s);

wherein the light guide has a first portion main body coplanar with an object to be illuminated separate from the detection circuit for light emission to the object to be illuminated and a second portion different from the first portion and non-coplanar relative to the first portion for receiving ambient light, the light guide being so configured such that, in use, the object to be illuminated does not cover the second portion of the light guide, and the second portion extends from the main body of the light guide so as not to be covered by the object to be illuminated; and wherein the second portion is optically integral with the first portion such that light passes directly between the first portion and the second portion, and the light source that is used as the photosensor is configured to illuminate the first portion of the light guide and the object to be illuminated.

* * * * *

UNITED STATES PATENT AND TRADEMARK OFFICE
CERTIFICATE OF CORRECTION

| | |
|---|---|
| PATENT NO. | : 9,326,348 B2 |
| APPLICATION NO. | : 12/663880 |
| DATED | : April 26, 2016 |
| INVENTOR(S) | : Rakesh Roshan et al. |

Page 1 of 1

It is certified that error appears in the above-identified patent and that said Letters Patent is hereby corrected as shown below:

On the title page item (22), should read -- PCT Filed: May 23, 2008 --.

Signed and Sealed this
Twenty-sixth Day of July, 2016

Michelle K. Lee
*Director of the United States Patent and Trademark Office*